US012785882B2

(12) United States Patent
Gao et al.

(10) Patent No.: US 12,785,882 B2
(45) Date of Patent: Nov. 3, 2026

(54) METHOD, DEVICE AND COMPUTER READABLE MEDIUM FOR COMMUNICATION USING AN OFFSET

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 246 days.

(21) Appl. No.: 18/576,238

(22) PCT Filed: Jul. 7, 2021

(86) PCT No.: PCT/CN2021/105057
§ 371 (c)(1),
(2) Date: Jan. 3, 2024

(87) PCT Pub. No.: WO2023/279301
PCT Pub. Date: Jan. 12, 2023

(65) Prior Publication Data
US 2024/0313913 A1 Sep. 19, 2024

(51) Int. Cl.
*H04L 5/00* (2006.01)

(52) U.S. Cl.
CPC .......... *H04L 5/0048* (2013.01); *H04L 5/0012* (2013.01)

(58) Field of Classification Search
None
See application file for complete search history.

(56) References Cited

U.S. PATENT DOCUMENTS

| | | | | |
|---|---|---|---|---|
| 11,864,146 B2* | 1/2024 | Zarifi | H04W 56/005 | |
| 2011/0013546 A1* | 1/2011 | Hao | H04L 5/005 | 370/294 |
| 2012/0263129 A1* | 10/2012 | Noh | H04L 5/0023 | 370/329 |
| 2017/0048717 A1* | 2/2017 | Yoo | H04L 27/2613 | |
| 2019/0363911 A1* | 11/2019 | Choi | H04L 5/0051 | |

(Continued)

FOREIGN PATENT DOCUMENTS

CN 111865545 A 10/2020

OTHER PUBLICATIONS

Japanese Office Action for JP Application No. 2024-500213 mailed on Nov. 19, 2024 with English Translation.

(Continued)

*Primary Examiner* — Jenee Holland
(74) *Attorney, Agent, or Firm* — Sughrue Mion, PLLC

(57) ABSTRACT

Embodiments of the present disclosure relate to methods, devices and computer readable media for communication. According to embodiments of the present disclosure, a terminal device receives, from a first network device, at least one configuration of a sounding reference signal (SRS) which comprises a first configuration of a first subband and a second configuration of a partial sounding. The terminal device determines a size of a second subband based on the first and second configurations. The size is multiple of four. The terminal device also determines an index of a start resource block of the second subband. The index of the start resource block is multiple of four. The terminal device transmits the SRS based on the size of the second subband and the index to the network device. In this way, the partial SRB is supported.

19 Claims, 15 Drawing Sheets

(56) References Cited

U.S. PATENT DOCUMENTS

| | | | | |
|---|---|---|---|---|
| 2021/0105156 | A1 | 4/2021 | Chuang | |
| 2022/0248329 | A1* | 8/2022 | Peng | H04W 52/0216 |
| 2024/0372668 | A1* | 11/2024 | Zhang | H04L 5/00 |

OTHER PUBLICATIONS

Spreadtrum Communications, "Considerations on SRS enhancement", 3GPP TSG RAN WG1 #104b-e R1-2102446, Apr. 20, 2021.
3rd Generation Partnership Project; Technical Specification Group Radio Access Network; NR; "Physical channels and modulation" (Release 16), 3GPP TS 38.211 V16.6.0, Jun. 30, 2021.
IIS Fraunhofer et al., "Enhancements on SRS for coverage and capacity", 3GPP TSG RAN WG1 #104-bis-e, R1-2103679, e-Metting, Apr. 20, 2021, pp. 1-3.
Vivo, "Discussion on SRS enhancement", 3GPP TSG RAN WG1 #103-e, R1-2007649, e-Meeting, Nov. 13, 2020, pp. 1-21.
Oppo, "Enhancements on SRS flexibility, coverage and capacity", 3GPP TSG RAN WG1 #103-e, R1-2008222, e-Meeting, Nov. 13, 2020, pp. 1-10.
Zte et al., "Discussion on SRS design for NR", 3GPP TSG RAN WG1 Meeting 90bis, R1-1717435, Prague, CZ, 9th, Oct. 13, 2017.
International Search Report for PCT/CN2021/105057 dated Apr. 6, 2022.
Written Opinion for PCT/CN2021/105057 dated Apr. 6, 2022.

* cited by examiner

METHOD, DEVICE AND COMPUTER READABLE MEDIUM FOR COMMUNICATION USING AN OFFSET

CROSS REFERENCE TO RELATED APPLICATIONS

This application is a National Stage of International Application No. PCT/CN2021/105057 filed Jul. 7, 2021.

TECHNICAL FIELD

Embodiments of the present disclosure generally relate to the field of telecommunication, and in particular, to methods, devices and computer storage media for communication.

BACKGROUND

With development of communication technologies, several solutions have been proposed to provide efficient and reliable solutions for communication. For example, multi-input-multi-output (MIMO) has been proposed. MIMO includes features that facilitate utilization of a large number of antenna elements at base station for both sub-6 GHZ and over-6 GHz frequency bands. Moreover, sounding reference signals (SRS) are transmitted on the uplink and allow the network to estimate the quality of the channel at different frequencies. The SRS is used by the base station to estimate the quality of the uplink channel for large bandwidths outside the assigned span to a specific UE.

SUMMARY

In general, embodiments of the present disclosure provide methods, devices and computer storage media for communications.

In a first aspect, there is provided a method of communication. The method comprises: receiving, at a terminal device and from a network device, at least one configuration of a sounding reference signal, the configuration comprising a first configuration of a first subband and a second configuration of a partial sounding; determining, based on the first configuration and the second configuration, a size of a second subband, the size of the second subband being multiple of four; determining an index of a start resource block of the second subband, the index of the start resource block being multiple of four; and transmitting, to the network device, the sounding reference signal based on the size of the second subband and the index.

In a second aspect, there is provided a method of communication. The method comprises: receiving, at a terminal device and from a network device, at least one configuration of a sounding reference signal, the at least one configuration comprising a first configuration of a first subband and a second configuration of a partial sounding; determining a maximum number of a cyclic shift based on a comb parameter, and the second configuration; and transmitting, to the network device, the sounding reference signal based on the maximum number of the cyclic shift, the first and second configurations.

In a third aspect, there is provided a method of communication. The method comprises: receiving, at a terminal device and from a network device, at least one configuration of a sounding reference signal, the configuration comprising a first configuration of a first subband and a second configuration of a partial sounding; determining an index of a start resource block of a second subband, wherein the index is based on the first configuration, the second configuration and an offset; and transmitting, to the network device, the sounding reference signal based on the index.

In a fourth aspect, there is provided a method of communication. The method comprises transmitting, at a network device and to a terminal device, a configuration of a sounding reference signal, the configuration comprising a first configuration of a first subband and a second configuration of a partial sounding; and receiving, from the terminal device, the sounding reference signal based on a size of a second subband and an index of a start resource block, the size of the second subband being multiple of four and the index of the start resource block being multiple of four.

In a fifth aspect, there is provided a method of communication. The method comprises transmitting, at a network device and to a terminal device, at least one configuration of a sounding reference signal, the at least one configuration comprising a first configuration of a first subband and a second configuration of a partial sounding; and receiving, from the terminal device, the sounding reference signal based on the maximum number of the cyclic shift, the first and second configurations.

In a sixth aspect, there is provided a method of communication. The method comprises transmitting, at a network device and to a terminal device, at least one configuration of a sounding reference signal, the configuration comprising a first configuration of a first subband and a second configuration of a partial sounding; and receiving, from the terminal device, the sounding reference signal based on an index of a start resource block of a second subband, wherein the index is based on the first configuration, the second configuration and an offset.

In a seventh aspect, there is provided a terminal device. The terminal device comprises a processor and a memory coupled to the processor. The memory stores instructions that when executed by the processor, cause the terminal device to perform the method according to any one of the first, second or third aspect.

In an eighth aspect, there is provided a network device. The network device comprises a processor and a memory coupled to the processor. The memory stores instructions that when executed by the processor, cause the network to perform the method according to any one of the fourth, fifth or sixth aspect.

In a ninth aspect, there is provided a computer readable medium having instructions stored thereon. The instructions, when executed on at least one processor, cause the at least one processor to perform the method according to the first, second, third, fourth, fifth, or sixth aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
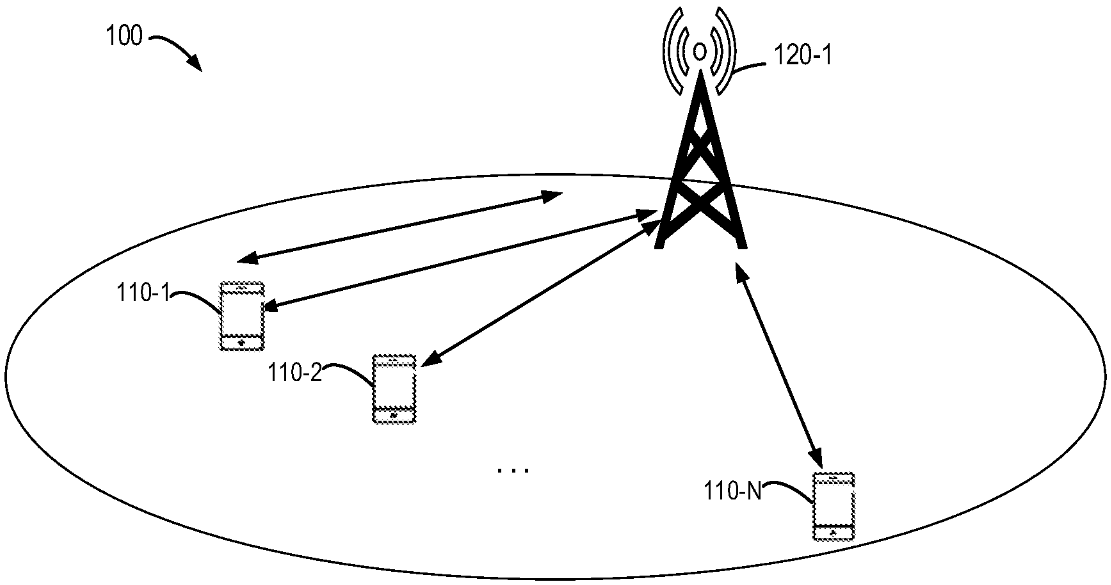
FIG. 1 is a schematic diagram of a communication environment in which embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and play back appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' 'second,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

As mentioned above, SRS has been proposed. For SRS frequency hopping, SRS band/subband configuration is nested. For aperiodic SRS, only intra-slot hopping supported, and the number of hopping is limited, 2 or 4. For semi-persistent and periodic SRS, intra and inter-slot or inter-slot hopping supported.

If the value of the start resource block (RB) index is restricted to be multiple of 4, then the available cases for partial frequency sounding are restricted. If the value of the start RB index can be any integer or minimum of 4, more available cases, while there are some new values of subband, e.g. 5, 6, 7, 10, 14, 18, . . . which is not multiple of 4, restricted on multiplexing (capacity) and aligned boundary. If the value of the start RB index is round to be multiple of 4, aligned boundary with unit of 4, multiplexing with legacy or between new UE is possible, detailed designs need to be considered. In the disclosure, the terms "PRB", "RB", "physical resource block" and "resource block" can be used interchangeably.

In some situations, if the value of the start RB index is not multiple of 4 (for example, 6), the subband for partial sounding cannot be aligned/(CDMed) with subband for non-partial sounding. The boundary of subband for partial sounding cannot be aligned with unit of 4 PRBs. The subband for partial sounding may not be aligned with another subband for partial sounding, if the starting positions of different subbands are different. The available values of comb (KTC) are restricted, e.g. for value of 6, KTC can only be 2 or 4 (can not be 8), which will limit the capacity (multiplexing). Even if the subband for partial sounding is aligned, e.g. for value of 6, the available value of CS is limited, e.g. in case of KTC=4, sequence length is 18, 6 values of CS are available, which is less than maximum number of CS (12) for KTC being 4. Alternatively, the value of the start RB index is restricted to be multiple of 4, then it seems no need of partial sounding at all, legacy configuration can support the cases. For example, if subband is 12, no partial sounding is supported. For maximum number of cyclic shift, in current spec, it's a function of KTC. While for partial sounding, the sequence length will be changed/reduced based on the parameter $P_F$, which will also impact the value of $$n_{SRS}^{cs,max}.$$

Moreover, if start RB location hopping is supported, the granularity/pattern for hopping needs to be decided.

In order to solve at least part of above problems, solutions on partial SRS are needed. According to embodiments of the present disclosure, a terminal device receives, from a first network device, at least one configuration of a sounding reference signal (SRS) which comprises a first configuration of a first subband and a second configuration of a partial sounding. The terminal device determines a size of a second subband based on the first and second configurations. The size is multiple of four. The terminal device also determines an index of a start resource block of the second subband. The index of the start resource block is multiple of four. The terminal device transmits the SRS based on the size of the second subband and the index to the network device. In this way, the partial SRB is supported.

FIG. 1 illustrates a schematic diagram of a communication system in which embodiments of the present disclosure can be implemented. The communication system 100, which is a part of a communication network, comprises a terminal device 110-1, a terminal device 110-2, . . . a terminal device 110-N, which can be collectively referred to as "terminal device(s) 110." The number N can be any suitable integer number.

The communication system 100 further comprises a network device 120-1, a network device 120. In the communication system 100, the network devices 120 and the terminal devices 110 can communicate data and control information to each other. The numbers of devices shown in FIG. 1 are given for the purpose of illustration without suggesting any limitations.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology; comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Embodiments of the present disclosure can be applied to any suitable scenarios. For example, embodiments of the present disclosure can be implemented at reduced capability NR devices. Alternatively, embodiments of the present disclosure can be implemented in one of the followings: NR multiple-input and multiple-output (MIMO), NR sidelink enhancements, NR systems with frequency above 52.6 GHZ, an extending NR operation up to 71 GHZ, narrow band-Internet of Thing (NB-IOT)/enhanced Machine Type Communication (eMTC) over non-terrestrial networks (NTN), NTN, UE power saving enhancements, NR coverage enhancement, NB-IoT and LTE-MTC, Integrated Access and Backhaul (IAB), NR Multicast and Broadcast Services, or enhancements on Multi-Radio Dual-Connectivity.

Figure 2:
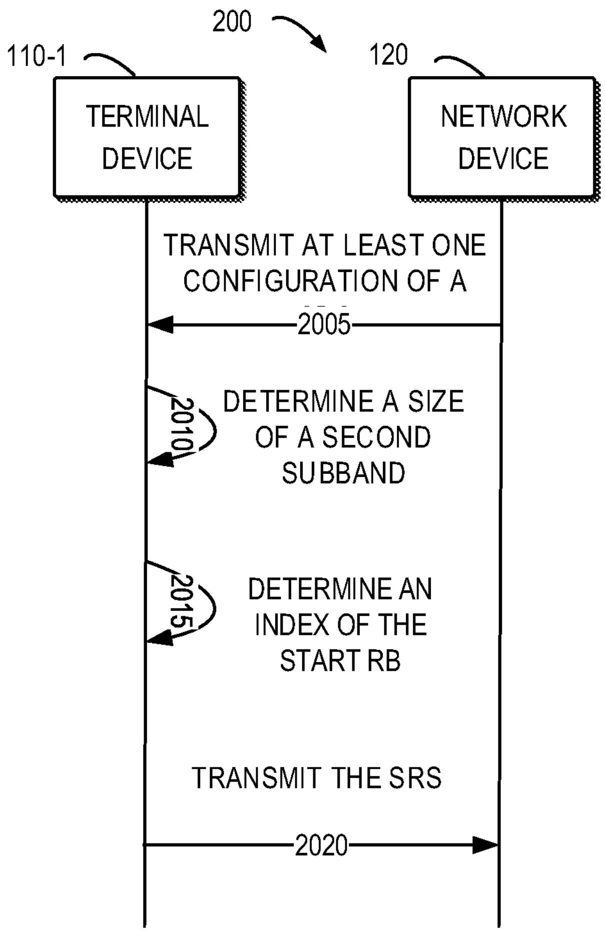
FIG. 2 illustrates a signaling flow of transmitting a sounding reference signal according to some embodiments of the present disclosure.

FIG. 2 shows a signaling chart illustrating process 200 among devices according to some example embodiments of the present disclosure. Only for the purpose of discussion, the process 200 will be described with reference to FIG. 1. The process 200 may involve the terminal device 110-1, the network device 120 in FIG. 1. It should be noted that the process 200 is only an example not limitation.

The network device 120 transmits 2005 at least one configuration of a SRS to the terminal device 110-1. The configuration comprises a first configuration of a first subband and a second configuration of a partial sounding. In some embodiments, the first configuration can comprise a number of physical resource blocks. Alternatively or in addition, the first configuration can comprise a bandwidth parameter of sounding reference signal ($B_{SRS}$). The second configuration can comprise a partial frequency ($P_F$).

The terminal device 110-1 determines a size of a second subband based on the first and second configurations. The size of the second subband is multiple of four. It should be noted that the size of the second subband can be multiple of any suitable number which is not limited to four. The terminal device 110-1 also determines an index of a start resource block of the second subband. The index of the start resource block is multiple of four. It should be noted that the index of the start resource block can be multiple of any suitable number which is not limited to four. The terminal device 110-1 transmits the SRS to the network device 120 based on the size of the second subband and the index. Details of the determinations of the second subband and the index of the start resource block are described with the reference to FIGS. 3-7C.

In some embodiments, the terminal device 110-1 may receive at least one configuration for a first subband of SRS. In some embodiments, the size of first subband may be represented as $m_{SRS,B_{SRS}}$, and $m_{SRS,B_{SRS}}$ is a positive integer. For example, $m_{SRS,B_{SRS}}$ is a positive integer of multiple of four. As another example, $m_{SRS,B_{SRS}}$ positive integer of multiple of four, and $4 \le m_{SRS,B_{SRS}} \le 272$. As another example, $m_{SRS,B_{SRS}}$ may be at least one of {4, 8, 12, 16, 20, 24, 28, 32, 36, 40, 44, 48, 52, 56, 60, 64, 68, 62, 76, 80, 84, 88, 92, 96, 104, 108, 112, 120, 128, 132, 136, 144, 152, 160, 168, 176, 184, 192, 208, 216, 224, 240, 256, 264, 272}. In some embodiments, the terminal device 110-1 may receive a configuration for a frequency hopping bandwidth of SRS. For example, when frequency hopping for SRS is enabled, the frequency hopping bandwidth of SRS is configured. As another example, the size of frequency hopping bandwidth is a positive integer of a multiple of four. As another example, the size of frequency hopping bandwidth is a positive integer multiple of the size of the first subband.

In some embodiments, the terminal device 110-1 may receive a configuration of a parameter for a partial frequency sounding of SRS, for example, the parameter is represented as "$P_F$". In some embodiments, the value of $P_F$ is a positive integer. For example, $1 \le P_F \le 16$. As another example, $P_F$ may be at least one of {1, 2, 3, 4, 8, 12, 16}. As another example, $P_F$ may be at least one of {1, 2, 4, 8} or {1, 2, 4} or {2, 4}. In some embodiments, a second subband for SRS or a length of SRS sequence is determined based on the size of the first subband, and the parameter $P_F$. In some embodiments, the size of second subband is $$\frac{1}{P_F} * m_{SRS,B_{SRS}}.$$

In some embodiments, the second subband is a second number of resource blocks (RBs) within the range of the first subband with a first number of RBs. In some embodiments, the time and/or frequency resource of the second subband is within the range of the time and/or frequency resource of the first subband. For example, the first number is larger than or no less than the second number. As another example, the first number is $P_F$ multiple of the second number. As another example, the first number is two or four or eight times of the second number.

In some embodiments, the start RB index of the second subband within the first subband may be determined based on the at least one configuration for the first subband, the parameter $P_F$, and an offset. In some embodiments, the offset is determined based on at least one of a slot index/number within a subframe (for example, the slot index may be at least one value of an integer ∈{0, 1, . . . 15}), a slot index/number within a frame (for example, the slot index/number may be at least one value of an integer ∈{0, 1, . . . 159}), a symbol index/number within a slot (for example, the symbol index/number may be at least one value of an integer ∈{0, 1, . . . 13} or {0, 1, . . . 11}), a hopping index, an index for counting of SRS transmission(s), an SRS counter and a parameter for offset. In some embodiments, the hopping index or the index for counting of SRS transmission(s) or the SRS counter may be determined at least based on a symbol index/number within all the symbols of an SRS resource, and a repetition factor. For example, the number of all the symbols of an SRS resource may be configured via at least one of DCI, MAC CE and RRC, and the value of the number of all the symbols of an SRS resource may be at least one of {1, 2, 4, 8, 12}. As another example, the symbol index/number within all the symbols of an SRS resource may be at least one of {0, 1, 2, 3, 4, 5, 6, 7, 8, 9, 10, 11, 12}. As another example, the repetition factor may be configured via at least one of DCI, MAC CE and RRC. And the value of repetition factor may be at least one of {1, 2, 3, 4, 6, 8, 12}. In some embodiments, the hopping index or the index for counting of SRS transmission(s) or the SRS counter may be floor(l'/R), wherein l' may be the symbol index/number within all the symbols of an SRS resource, and R may be the repetition factor. For example, when the SRS resource is configured as aperiodic. For example, the SRS resource is configured as aperiodic by the higher-layer parameter resourceType. In some embodiments, the hopping index or the index for counting of SRS transmission(s) or the SRS counter may be $$\left(\frac{N_{slot}^{frame,\mu} \cdot n_f + n_{s,f}^{\mu} - T_{offset}}{T_{SRS}}\right) \cdot \left(\frac{N_{symb}^{SRS}}{R}\right) + \text{floor}\left(\frac{l'}{R}\right),$$

wherein l' may be the symbol index/number within all the symbols of an SRS resource, R may be the repetition factor, $$N_{slot}^{frame,\mu}$$

may be the number of slots per frame for subcarrier spacing configuration μ. For example, μ may be at least one of {0, 1, 2, 3, 4}, and μ=0 corresponding to 15 kHz subcarrier spacing, μ=1 corresponding to 30 kHz subcarrier spacing, μ=2 corresponding to 60 kHz subcarrier spacing, μ=3 corresponding to 120 kHz subcarrier spacing and μ=4 corresponding to 240 kHz subcarrier spacing. And $$N_{slot}^{frame,\mu}$$

may be at least one of {10, 20, 40, 80, 160}. For example, $$N_{slot}^{frame,\mu} = 10$$

if subcarrier spacing is configured as 15 kHz, $$N_{slot}^{frame,\mu} = 20$$

if subcarrier spacing is configured as 30 KHz, $$N_{slot}^{frame,\mu} = 40$$

if subcarrier spacing is configured as 60 kHz, $$N_{slot}^{frame,\mu} = 80$$

if subcarrier spacing is configured as 120 kHz, and $$N_{slot}^{frame,\mu} = 160$$

if subcarrier spacing is configured as 240 kHz, $n_f$ may be the system frame number, $$n_{s,f}^{\mu}$$

may be the slot index/number within a frame for subcarrier spacing configuration μ. $T_{SRS}$ may be the periodicity in term of slots configured for the SRS, and $T_{offset}$ may be the slot offset configured for the SRS. For example, $T_{SRS}$ may be a positive integer. For example, $T_{SRS}$ may be at least one of {1, 2, 4, 5, 8, 10, 16, 20, 32, 40, 64, 80, 160, 320, 640, 1280, 2560, 5120, 10240, 40960, 81920}. For example, $T_{offset}$ may be a non-negative integer. For example, $0 \le T_{offset} \le T_{SRS}-1$. For example, when the SRS resource is configured as periodic or semi-persistent. For example, the SRS resource is configured as periodic or semi-persistent by the higher-layer parameter resourceType. In some embodiments, the parameter for offset may be configured from the network device, for example, via at least one of RRC, MAC CE and DCI. For example, the value of the parameter for offset may be non-negative integer. For example, the value of the parameter for offset may be in the range of {0, 1, . . . $P_F-1$}.

In some embodiments, the sizes of the second subbands may be different based on at least one of an index of the second subband within the first subband and a starting RB index of the second subband within the first subband, and/or the sizes of second subbands may be multiple of 4. For example, when the value of $$\frac{1}{P_F} * m_{SRS,B_{SRS}}$$

is not an integer multiple of four or $$\left(\frac{1}{P_F} * m_{SRS,B_{SRS}}\right) \bmod 4 \neq 0.$$

For example, the second subbands may be within a same first subband.

In some embodiments, when the value of $P_F$ is configured as 2, and if $$\frac{1}{P_F} * m_{SRS,B_{SRS}}$$

is not an integer multiple of four or $$\left(\frac{1}{P_F} * m_{SRS,B_{SRS}}\right) mo\ 4 \neq 0,$$

there may be two second subbands (for example, second subband SS1 and second subband SS2) within the first subband $m_{SRS,B_{SRS}}$, and the sizes of the two second subbands may be different. For example, size of SS1 may be W and W is positive integer (For example, W mod 4=0.

As another example, $$W = \text{floor}\left(\frac{1}{P_F} * m_{SRS,B_{SRS}}/4\right) * 4 \text{ or } \text{ceil}\left(\frac{1}{P_F} * m_{SRS,B_{SRS}}/4\right) * 4 \text{ or round } \left(\frac{1}{P_F} * m_{SRS,B_{SRS}}/4\right) * 4\Big),$$

and size of SS2 may be V and V is positive integer (For example, V mod 4=0. As another example, $V=m_{SRS,B_{SRS}}-W$), and $W+V=M_{SRS,B_{SRS}}$, $W \neq V$. For example, W−V=4 or V−W=4. In some embodiments, the starting RB index (for example, SRB) for any of the second subband within the first subband may be a multiple of four or SRB mod 4=0. In some embodiments, the starting RB index within the first subband for SS1 may be 0. In some embodiments, the starting RB index within the first subband for SS2 may be W. For example, the starting RB index within the first subband for SS2 is not $$\frac{1}{P_F} * m_{SRS,B_{SRS}} \text{ or } \frac{1}{P_F} * m_{SRS,B_{SRS}}.$$

In some embodiments, the starting RB index for SS1 is smaller than the starting RB index for SS2.

In some embodiments, when the value of $P_F$ is configured as 2, and if $$\frac{1}{P_F} * m_{SRS,B_{SRS}}$$

is not an integer multiple of four or $$\left(\frac{1}{P_F} * m_{SRS,B_{SRS}}\right) \bmod 4 \neq 0,$$

there may be two second subbands (for example, second subband SS1 and second subband SS2) within the first subband $m_{SRS,B_{SRS}}$, and the sizes of the two second subbands may be same. For example, size of SS1 and SS2 may be W and W is positive integer. For example, W mod 4=0. As another example, $$W=\text{floor}\left(\frac{1}{P_F}*m_{SRS,B_{SRS}}/4\right)*4 \text{ or } \text{ceil}\left(\frac{1}{P_F}*m_{SRS,B_{SRS}}/4\right)*4 \text{ or } \text{round}\left(\frac{1}{P_F}*m_{SRS,B_{SRS}}/4\right)*4\Big).$$

For example, $W*2=m_{SRS,B_{SRS}}-4$. As another example, $W*2=m_{SRS,B_{SRS}}+4$. In some embodiments, the starting RB index (for example, SRB) for any of the second subband within the first subband may be a multiple of four or SRB mod 4=0. In some embodiments, the starting RB index within the first subband for SS1 may be 0, and the starting RB index within the first subband for SS2 may be W−4 or $m_{SRS,B_{SRS}}-W$. For example, if $W*2=m_{SRS,B_{SRS}}+4$. For example, there may be 4 RBs overlapped for SS1 and SS2. In some embodiments, the starting RB index within the first subband for SS1 may be 0 or 4, and the starting RB index within the first subband for SS2 may be W+4 or $m_{SRS,B_{SRS}}-W$. For example, if $W*2=m_{SRS,B_{SRS}}-4$. In some embodiments, there may be 4 RBs within the first subband, wherein the 4 RBs are not overlapped with any one of SS1 and SS2. For example, the starting RB index for the 4 RBs may be 0 or W or W*2 within the first subband. For example, the starting RB index within the first subband for SS2 is not $$\frac{1}{P_F}*m_{SRS,B_{SRS}} \text{ or } \frac{1}{2}*m_{SRS,B_{SRS}}.$$

In some embodiments, the starting RB index for SS1 is smaller than the starting RB index for SS2.

In some embodiments, if $W*2=m_{SRS,B_{SRS}}-4$, the starting RB index for SS1 may be different based on at least one of the slot index/number within a subframe (for example, the slot index may be at least one value of an integer ∈{0, 1, . . . 15}), the slot index/number within a frame (for example, the slot index/number may be at least one value of an integer ∈{0, 1, . . . 159}), the symbol index/number within a slot (for example, the symbol index/number may be at least one value of an integer ∈{0, 1, . . . 13} or {0, 1, . . . 11}), the hopping index, the index for counting of SRS transmission(s), the SRS counter and the parameter for offset. For example, the possible values for the starting RB index for SS1 may be 0 or 4. In some embodiments, if $W*2=m_{SRS,B_{SRS}}-4$, the starting RB index for SS2 may be different based on at least one of the slot index/number within a subframe (for example, the slot index may be at least one value of an integer ∈{0, 1, . . . 15}), the slot index/number within a frame (for example, the slot index/number may be at least one value of an integer ∈{0, 1, . . . 159}), the symbol index/number within a slot (for example, the symbol index/number may be at least one value of an integer ∈{0, 1, . . . 13} or {0, 1, . . . 11}), the hopping index, the index for counting of SRS transmission(s), the SRS counter and the parameter for offset. For example, the possible values for the starting RB index for SS2 may be W or W+4 or $m_{SRS,B_{SRS}}-W$ or $m_{SRS,B_{SRS}}-W-4$. In some embodiments, the starting RB index for SS1 is smaller than the starting RB index for SS2.

In some embodiments, when the value of $P_F$ is configured as 4, and if $$\frac{1}{P_F}*m_{SRS,B_{SRS}}$$

is not an integer multiple of four or $$\left(\frac{1}{P_F}*m_{SRS,B_{SRS}}\right)\text{mod}4\neq 0,$$

there may be four second subbands (for example, second subband SS1, second subband SS2, second subband SS3 and second subband SS4) within the first subband $m_{SRS,B_{SRS}}$, and there may be two different values for the sizes of the four second subbands. For example, one of the size may be W and W is positive integer (For example, W mod 4=0. As another example, $$W=\text{floor}\left(\frac{1}{P_F}*m_{SRS,B_{SRS}}/4\right)*4 \text{ or } \text{ceil}\left(\frac{1}{P_F}*m_{SRS,B_{SRS}}/4\right)*4 \text{ or } \text{round}\left(\frac{1}{P_F}*m_{SRS,B_{SRS}}/4\right)*4\Big).$$

And the other one of the size may be V=W+4 or V=W−4. In some embodiments, the starting RB index for SS1 is smaller than the starting RB index for SS2, and the starting RB index for SS2 is smaller than the starting RB index for SS3, and the starting RB index for SS3 is smaller than the starting RB index for SS4. In some embodiments, the starting RB index within the first subband for SS2 is not $$\frac{1}{P_F}*m_{SRS,B_{SRS}} \text{ or } \frac{1}{4}*m_{SRS,B_{SRS}},$$

the starting RB index within the first subband for SS3 is not $$\frac{2}{P_F}*m_{SRS,B_{SRS}} \text{ or } \frac{2}{4}*m_{SRS,B_{SRS}},$$

the starting RB index within the first subband for SS4 is not $$\frac{3}{P_F}*m_{SRS,B_{SRS}} \text{ or } \frac{3}{4}*m_{SRS,B_{SRS}}.$$

In some embodiments, if $m_{SRS,B_{SRS}}-W*4=4$ or if $W*4-m_{SRS,B_{SRS}}=4$, the size of the second subband may be same for three second subbands within the first subband, for example, the size may be W and W is positive integer. And the size of the remaining one of second subband may be V=W+4 (for example, if $m_{SRS,B_{SRS}}-W*4=4$) or V=W−4 (for example, if $W*4-m_{SRS,B_{SRS}}=4$). For example, the one of second subband with size V may be any one of SS1, SS2, SS3 or SS4. As another example, the one of second subband with size V may be different based on at least one of the slot index/number within a subframe (for example, the slot index may be at least one value of an integer ∈{0, 1, . . . 15}), the slot index/number within a frame (for example, the slot index/number may be at least one value of an integer ∈{0, 1, . . . 159}), the symbol index/number within a slot (for example, the symbol index/number may be at least one value of an integer ∈{0, 1, . . . 13} or {0, 1, . . . 11}), the hopping index, the index for counting of SRS transmission(s), the SRS counter and the parameter for offset. In some embodiments, the starting RB index (for example, SRB) for any of the second subband within the first subband may be a multiple of four or SRB mod 4=0. In some embodiments, the starting RB index within the first subband for SS1 may be 0. In some embodiments, the starting RB index within the first subband for SS2 may be W (for example, if the size of SS1 is W) or V (for example, if the size of SS1 is V). In some embodiments, the starting RB index within the first subband for SS3 may be W*2 (for example, if the size of SS1 and SS2 is W) or V+W (for example, if the size of one of SS1 and SS2 is V). In some embodiments, the starting RB index within the first subband for SS4 may be W*3 (for example, if the size of SS1 and SS2 and SS3 is W) or V+W*2 (for example, if the size of one of SS1 and SS2 and SS3 is V).

In some embodiments, if $m_{SRS,B_{SRS}}$–W*4=8 or if W*4–$m_{SRS,B_{SRS}}$=8, the size of the second subband may be same for two second subbands within the first subband, for example, the size may be W and W is positive integer. And the size of the remaining two second subbands may be V=W+4 (for example, if $m_{SRS,B_{SRS}}$–W*4=8) or V=W–4 (for example, if W*4–$m_{SRS,B_{SRS}}$=4). For example, the two second subbands with size V may be any two of SS1, SS2, SS3 or SS4. For example, SS1 and SS3 or SS2 and SS4 or SS3 and SS4 or SS1 and SS2. As another example, the two second subbands with size V may be different based on at least one of the slot index/number within a subframe (for example, the slot index may be at least one value of an integer ∈{0, 1, . . . 15}), the slot index/number within a frame (for example, the slot index/number may be at least one value of an integer ∈{0, 1, . . . 159}), the symbol index/number within a slot (for example, the symbol index/number may be at least one value of an integer ∈{0, 1, . . . 13} or {0, 1, . . . 11}), the hopping index, the index for counting of SRS transmission(s), the SRS counter and the parameter for offset. In some embodiments, the starting RB index (for example, SRB) for any of the second subband within the first subband may be a multiple of four or SRB mod 4=0. In some embodiments, the starting RB index within the first subband for SS1 may be 0. In some embodiments, the starting RB index within the first subband for SS2 may be W (for example, if the size of SS1 is W) or V (for example, if the size of SS1 is V). In some embodiments, the starting RB index within the first subband for SS3 may be W*2 (for example, if the size of SS1 and SS2 is W) or V+W (for example, if the size of one of SS1 and SS2 is V). In some embodiments, the starting RB index within the first subband for SS4 may be W*2+V (for example, if the size of one of SS1 and SS2 and SS3 is V) or V*2+W (for example, if the size of two of SS1 and SS2 and SS3 is V).

In some embodiments, when the value of $P_F$ is configured as 4, and if $$\frac{1}{P_F} * m_{SRS,B_{SRS}}$$

is not an integer multiple of four or $$\left(\frac{1}{P_F} * m_{SRS,B_{SRS}}\right) \bmod 4 \neq 0,$$

there may be four second subbands (for example, second subband SS1, second subband SS2, second subband SS3 and second subband SS4) within the first subband $m_{SRS,B_{SRS}}$, and the sizes of the four second subbands may be same. For example, the size may be W, and W is positive integer. For example, W mod 4=0 As another example, $$W = \text{floor}\left(\frac{1}{P_F} * m_{SRS,B_{SRS}}/4\right) * 4 \text{ or } \text{ceil}\left(\frac{1}{P_F} * m_{SRS,B_{SRS}}/4\right) * 4 \text{ or } \text{round}\left(\frac{1}{P_F} * m_{SRS,B_{SRS}}/4\right) * 4\Big).$$

For example, W*4=$m_{SRS,B_{SRS}}$–4. As another example, W*4=$m_{SRS,B_{SRS}}$+4. As another example, W*4=$m_{SRS,B_{SRS}}$–8. As another example, W*4=$m_{SRS,B_{SRS}}$+8. In some embodiments, the starting RB index for SS1 is smaller than the starting RB index for SS2, and the starting RB index for SS2 is smaller than the starting RB index for SS3, and the starting RB index for SS3 is smaller than the starting RB index for SS4. In some embodiments, the starting RB index within the first subband for SS2 is not $$\frac{1}{P_F} * m_{SRS,B_{SRS}} \text{ or } \frac{1}{4} * m_{SRS,B_{SRS}},$$

the starting RB index within the first subband for SS3 is not $$\frac{2}{P_F} * m_{SRS,B_{SRS}} \text{ or } \frac{2}{4} * m_{SRS,B_{SRS}},$$

the starting RB index within the first subband for SS4 is not $$\frac{3}{P_F} * m_{SRS,B_{SRS}} \text{ or } \frac{3}{4} * m_{SRS,B_{SRS}}.$$

In some embodiments, the starting RB index (for example, SRB) for any of the second subband within the first subband may be a multiple of four or SRB mod 4=0.

In some embodiments, if W*4=$m_{SRS,B_{SRS}}$+4, there may be 4 RBs overlapped for any pair of SS1 and SS2, SS2 and SS3, SS3 and SS4. In some embodiments, if W*4=$m_{SRS,B_{SRS}}$+4, the starting RB index within the first subband for SSI1 may be 0, and the starting RB index within the first subband for SS2 may be W, and the starting RB index within the first subband for SS3 may be 2*W–4, and the starting RB index within the first subband for SS4 may be 3*W–4 or $m_{SRS,B_{SRS}}$–W. For example, there may be 4 RBs overlapped for SS2 and SS3. In some embodiments, if W*4=$m_{SRS,B_{SRS}}$+4, the starting RB index within the first subband for SSI1 may be 0, and the starting RB index within the first subband for SS2 may be W, and the starting RB index within the first subband for SS3 may be 2*W, and the starting RB index within the first subband for SS4 may be 3*W–4 or $m_{SRS,B_{SRS}}$–W. For example, there may be 4 RBs overlapped for SS3 and SS4. In some embodiments, if W*4=$m_{SRS,B_{SRS}}$+4, the starting RB index within the first subband for SS1 may be 0, and the starting RB index within the first subband for SS2 may be W–4, and the starting RB index within the first subband for SS3 may be 2*W–4, and the starting RB index within the first subband for SS4 may be 3*W–4 or $m_{SRS,B_{SRS}}$–W. For example, there may be 4 RBs overlapped for SS1 and SS2.

In some embodiments, if W*4=$m_{SRS,B_{SRS}}$+8, there may be 4 RBs overlapped for two pairs of SS1 and SS2, SS2 and SS3, SS3 and SS4. In some embodiments, if W*4=$m_{SRS,B_{SRS}}$+8, the starting RB index within the first subband for SS1 may be 0, and the starting RB index within the first subband for SS2 may be W–4, and the starting RB index within the first subband for SS3 may be 2*W−4, and the starting RB index within the first subband for SS4 may be 3*W−8 or $m_{SRS,B_{SRS}}$−W. For example, there may be 4 RBs overlapped for SS1 and SS2 and 4 RBs overlapped for SS3 and SS4. In some embodiments, if W*4=$m_{SRS,B_{SRS}}$+8, the starting RB index within the first subband for SS1 may be 0, and the starting RB index within the first subband for SS2 may be W−4, and the starting RB index within the first subband for SS3 may be 2*W−8, and the starting RB index within the first subband for SS4 may be 3*W−8 or $m_{SRS,B_{SRS}}$−W. For example, there may be 4 RBs overlapped for SS1 and SS2, and 4 RBs overlapped for SS2 and SS3. In some embodiments, if W*4=$m_{SRS,B_{SRS}}$+8, the starting RB index within the first subband for SS1 may be 0, and the starting RB index within the first subband for SS2 may be W, and the starting RB index within the first subband for SS3 may be 2*W−4, and the starting RB index within the first subband for SS4 may be 3*W−8 or $m_{SRS,B_{SRS}}$−W. For example, there may be 4 RBs overlapped for SS2 and SS3, and 4 RBs overlapped for SS3 and SS4.

In some embodiments, if W*4=$m_{SRS,B_{SRS}}$−4 or W*4=$m_{SRS,B_{SRS}}$+4W*4=$m_{SRS,B_{SRS}}$−8 or W*4=$m_{SRS,B_{SRS}}$+8, the starting RB index for SS1 and/or SS2 and/or SS3 and/or SS4 may be different based on at least one of the slot index/number within a subframe (for example, the slot index may be at least one value of an integer ∈{0, 1, . . . 15}), the slot index/number within a frame (for example, the slot index/number may be at least one value of an integer ∈{0, 1, . . . 159}), the symbol index/number within a slot (for example, the symbol index/number may be at least one value of an integer ∈{0, 1, . . . 13} or {0, 1, . . . 11}), the hopping index, the index for counting of SRS transmission(s), the SRS counter and the parameter for offset.

In some embodiments, if W*4=$m_{SRS,B_{SRS}}$−4, there may be 4 RBs not overlapped for any one of SS1, SS2, SS3 and SS4. For example, the starting RB index for the 4 RBs may be 0 or W or 2+W or 3*W. In some embodiments, if W*4=$m_{SRS,B_{SRS}}$−4, the starting RB index within the first subband for SS1 may be 0, and the starting RB index within the first subband for SS2 may be W, and the starting RB index within the first subband for SS3 may be 2*W+4, and the starting RB index within the first subband for SS4 may be 3*W+4 or $m_{SRS,B_{SRS}}$−W. For example, there may be 4 RB between SS2 and SS3. In some embodiments, if W*4=$m_{SRS,B_{SRS}}$−4, the starting RB index within the first subband for SS1 may be 0, and the starting RB index within the first subband for SS2 may be W, and the starting RB index within the first subband for SS3 may be 2*W, and the starting RB index within the first subband for SS4 may be 3*W+4 or $m_{SRS,B_{SRS}}$−W. For example, there may be 4 RBs between SS3 and SS4. In some embodiments, if W*4=$m_{SRS,B_{SRS}}$−4, the starting RB index within the first subband for SS1 may be 0, and the starting RB index within the first subband for SS2 may be W+4, and the starting RB index within the first subband for SS3 may be 2*W+4, and the starting RB index within the first subband for SS4 may be 3*W+4 or $m_{SRS,B_{SRS}}$−W. For example, there may be 4 RBs between for SS1 and SS2. In some embodiments, if W*4=$m_{SRS,B_{SRS}}$−4, the starting RB index within the first subband for SS1 may be 4, and the starting RB index within the first subband for SS2 may be W+4, and the starting RB index within the first subband for SS3 may be 2*W+4, and the starting RB index within the first subband for SS4 may be 3*W+4 or $m_{SRS,B_{SRS}}$−W. In some embodiments, if W*4=$m_{SRS,B_{SRS}}$−4, the starting RB index within the first subband for SS1 may be 0, and the starting RB index within the first subband for SS2 may be W, and the starting RB index within the first subband for SS3 may be 2*W, and the starting RB index within the first subband for SS4 may be 3*W or $m_{SRS,B_{SRS}}$−W−4.

In some embodiments, if W*4=$m_{SRS,B_{SRS}}$−8, there may be 8 RBs not overlapped with any one of SS1, SS2, SS3 and SS4. In some embodiments, if W*4=$m_{SRS,B_{SRS}}$−8, the starting RB index within the first subband for SS1 may be 0, and the starting RB index within the first subband for SS2 may be W+4, and the starting RB index within the first subband for SS3 may be 2*W+4, and the starting RB index within the first subband for SS4 may be 3*W+8 or $m_{SRS,B_{SRS}}$−W. For example, there may be 4 RBs between SS1 and SS2 and 4 RBs between SS3 and SS4. In some embodiments, if W*4=$m_{SRS,B_{SRS}}$−8, the starting RB index within the first subband for SS1 may be 4, and the starting RB index within the first subband for SS2 may be W+4, and the starting RB index within the first subband for SS3 may be 2*W+8, and the starting RB index within the first subband for SS4 may be 3*W+8 or $m_{SRS,B_{SRS}}$−W. In some embodiments, if W*4=$m_{SRS,B_{SRS}}$−8, the starting RB index within the first subband for SS1 may be 4, and the starting RB index within the first subband for SS2 may be W+4, and the starting RB index within the first subband for SS3 may be 2*W+4, and the starting RB index within the first subband for SS4 may be 3*W+8 or $m_{SRS,B_{SRS}}$−W. In some embodiments, if W*4=$m_{SRS,B_{SRS}}$−8, the starting RB index within the first subband for SS1 may be 4, and the starting RB index within the first subband for SS2 may be W+4, and the starting RB index within the first subband for SS3 may be 2*W+4, and the starting RB index within the first subband for SS4 may be 3*W+4 or $m_{SRS,B_{SRS}}$−W−4. In some embodiments, if W*4=$m_{SRS,B_{SRS}}$−8, the starting RB index within the first subband for SS1 may be 0, and the starting RB index within the first subband for SS2 may be W, and the starting RB index within the first subband for SS3 may be 2*W+4, and the starting RB index within the first subband for SS4 may be 3*W+8 or $m_{SRS,B_{SRS}}$−W. In some embodiments, if W*4=$m_{SRS,B_{SRS}}$−8, the starting RB index within the first subband for SS1 may be 0, and the starting RB index within the first subband for SS2 may be W, and the starting RB index within the first subband for SS3 may be 2*W+4, and the starting RB index within the first subband for SS4 may be 3*W +4 or $m_{SRS,B_{SRS}}$−W−4. In some embodiments, if W+4=$m_{SRS,B_{SRS}}$−8, the starting RB index within the first subband for SS1 may be 0, and the starting RB index within the first subband for SS2 may be W, and the starting RB index within the first subband for SS3 may be 2*W, and the starting RB index within the first subband for SS4 may be 3*W+4 or $m_{SRS,B_{SRS}}$−W−4.

In some embodiments, the size of first subband may be configured as $m_{SRS,B_{SRS}}$=12, and the configuration of a partial sounding may be configured as $P_F$=2. For example, the size of SS1 may be 8, and the size of SS2 may be 4, the starting RB index for SS1 may be 0, and the starting RB index for SS2 may be 8. As another example, the size of SS1 may be 4 and the size of SS2 may be 8, the starting RB index for SS1 may be 0, and the starting RB index for SS2 may be 4. As another example, the size of SS1 and SS2 may be 4, the starting RB index for SS1 and SS2 may be {0, 4} or {4, 8} or {0, 8}, respectively. As another example, the size of SS1 and SS2 may be 8, the starting RB index for SS1 and SS2 may be {0, 4} respectively.

In some embodiments, the size of first subband may be configured as $m_{SRS,B_{SRS}}$=12, and the configuration of a partial sounding may be configured as $P_F$=4. For example, the size of SS1 and SS2 and SS3 and SS4 may be 4, the starting RB index for SS1 may be 0, the starting RB index for SS2 may be 4, the starting RB index for SS3 may be 8, and the starting RB index for SS4 may be 0 or 4 or 8. As another example, there may be 3 second subbands, and the size of SS1 and SS2 and SS3 may be 4, the starting RB index for SS1 may be 0, the starting RB index for SS2 may be 4, the starting RB index for SS3 may be 8.

In some embodiments, the size of first subband may be configured as $m_{SRS,B_{SRS}}$=20, and the configuration of a partial sounding may be configured as $P_F$=2. For example, the size of SS1 may be 12, and the size of SS2 may be 8, the starting RB index for SSI1 may be 0, and the starting RB index for SS2 may be 12. As another example, the size of SS1 may be 8 and the size of SS2 may be 12, the starting RB index for SS1 may be 0, and the starting RB index for SS2 may be 8. As another example, the size of SS1 and SS2 may be 8, the starting RB index for SS1 and SS2 may be {0, 8} or {4, 12} or {0, 12}, respectively. As another example, the size of SS1 and SS2 may be 12, the starting RB index for SS1 and SS2 may be {0, 8} respectively.

In some embodiments, the size of first subband may be configured as $m_{SRS,B_{SRS}}$=20, and the configuration of a partial sounding may be configured as $P_F$=4. For example, the size of SS1, SS2, SS3 and SS4 may be {8, 4, 4, 4} or {4, 8, 4, 4} or {4, 4, 8, 4} or {4, 4, 4, 8}, respectively, the starting RB index for SS1, SS2, SS3 and SS4 may be {0, 8, 12, 16} or {0, 4, 12, 16} or {0, 4, 8, 16} or {0, 4, 8, 12}, respectively. As another example, the size of SS1, SS2, SS3 and SS4 may be 4, the starting RB index for SS1, SS2, SS3 and SS4 may be {0, 8, 12, 16} or {0, 4, 12, 16} or {0, 4, 8, 16} or {0, 4, 8, 12} or {4, 8, 12, 16}, respectively. As another example, the size of SS1, SS2, SS3 and SS4 may be 8, the starting RB index for SS1, SS2, SS3 and SS4 may be {0, 4, 8, 12}, respectively.

In some embodiments, the size of first subband may be configured as $m_{SRS,B_{SRS}}$=24, and the configuration of a partial sounding may be configured as $P_F$=4. For example, the size of SS1, SS2, SS3 and SS4 may be {8, 8, 4, 4} or {4, 8, 8, 4} or {4, 4, 8, 8} or {4, 8, 4, 8} or {8, 4, 8, 4} or {8, 4, 4, 8}, respectively, the starting RB index for SS1, SS2, SS3 and SS4 may be {0, 8, 16, 20} or {0, 8, 16, 20} or {0, 4, 12, 20} or {0, 4, 12, 16} or {0, 8, 12, 20} or {0, 8, 12, 16}, respectively. As another example, the size of SS1, SS2, SS3 and SS4 may be 4, the starting RB index for SS1, SS2, SS3 and SS4 may be {0, 4, 8, 12} or {0, 4, 8, 16} or {0, 4, 8, 20} or {0, 4, 12, 20} or {0, 4, 16, 20} or {0, 4, 12, 16} or {0, 8, 12, 16} or {0, 8, 12, 20} or {0, 8, 16, 20} or {0, 12, 16, 20} or {4, 8, 12, 16} or {4, 8, 12, 20} or {4, 8, 16, 20} or {4, 12, 16, 20}, {8, 12, 16, 20}, respectively. As another example, the size of SS1, SS2, SS3 and SS4 may be 8, the starting RB index for SS1, SS2, SS3 and SS4 may be {0, 4, 8, 12} or {0, 4, 8, 16} or {0, 4, 12, 16} or {0, 8, 12, 16} or {4, 8, 12, 16}, respectively.

In some embodiments, the size of first subband may be configured as $m_{SRS,B_{SRS}}$=28, and the configuration of a partial sounding may be configured as $P_F$=2. For example, the size of SS1may be 12, and the size of SS2 may be 16, the starting RB index for SS1 may be 0, and the starting RB index for SS2 may be 12. As another example, the size of SS1 may be 16 and the size of SS2 may be 12, the starting RB index for SS1 may be 0, and the starting RB index for SS2 may be 16. As another example, the size of SS1 and SS2 may be 12, the starting RB index for SS1 and SS2 may be {0, 12} or {4, 16} or {0, 16}, respectively. As another example, the size of SS1 and SS2 may be 16, the starting RB index for SS1 and SS2 may be {0, 12} respectively.

In some embodiments, the size of first subband may be configured as $m_{SRS,B_{SRS}}$=28, and the configuration of a partial sounding may be configured as $P_F$=4. For example, the size of SS1, SS2, SS3 and SS4 may be {8, 8, 8, 4} or {8, 8, 4, 8} or {8, 4, 8, 8} or {4, 8, 8, 8}, respectively, the starting RB index for SS1, SS2, SS3 and SS4 may be {0, 8, 16, 24} or {0, 8, 16, 20} or {0, 8, 12, 20} or {0, 4, 12, 20}, respectively. As another example, the size of SS1, SS2, SS3 and SS4 may be 8, the starting RB index for SS1, SS2, SS3 and SS4 may be {0, 8, 16, 20} or {0, 4, 12, 20} or {0, 8, 12, 20}, respectively.

In some embodiments, the size of first subband may be configured as $m_{SRS,B_{SRS}}$=36, and the configuration of a partial sounding may be configured as $P_F$=2. For example, the size of SS1 may be 20, and the size of SS2 may be 16, the starting RB index for SS1 may be 0, and the starting RB index for SS2 may be 20. As another example, the size of SS1 may be 16 and the size of SS2 may be 20, the starting RB index for SS1 may be 0, and the starting RB index for SS2 may be 16. As another example, the size of SS1 and SS2 may be 16, the starting RB index for SS1 and SS2 may be {0, 16} or {4, 20} or {0, 20}, respectively. As another example, the size of SS1 and SS2 may be 20, the starting RB index for SS1 and SS2 may be {0, 16} respectively.

In some embodiments, the size of first subband may be configured as $m_{SRS,B_{SRS}}$=36, and the configuration of a partial sounding may be configured as $P_F$=4. For example, the size of SS1, SS2, SS3 and SS4 may be {8, 8, 8, 12} or {8, 8, 12, 8} or {8, 12, 8, 8} or {12, 8, 8, 8}, respectively, the starting RB index for SS1, SS2, SS3 and SS4 may be {0, 8, 16, 24} or {0, 8, 16, 28} or {0, 8, 20, 28} or {0, 12, 20, 28}, respectively. As another example, the size of SS1, SS2, SS3 and SS4 may be 8, the starting RB index for SS1, SS2, SS3 and SS4 may be {0, 8, 16, 24} or {0, 8, 16, 28} or {0, 8, 20, 28} or {0, 12, 20, 28} or {4, 12, 20, 28}, respectively.

In some embodiments, the size of first subband may be configured as $m_{SRS,B_{SRS}}$=40, and the configuration of a partial sounding may be configured as $P_F$=4. For example, the size of SS1, SS2, SS3 and SS4 may be {8, 8, 12, 12} or {8, 12, 12, 8} or {12, 12, 8, 8} or {12, 8, 12, 8} or {12, 8, 8, 12} or {8, 12, 8, 12}, respectively, the starting RB index for SS1, SS2, SS3 and SS4 may be {0, 8, 16, 28} or {0, 8, 20, 32} or {0, 12, 24, 32} or {0, 12, 20, 32} or {0, 12, 20, 28} or {0, 8, 20, 28}, respectively. As another example, the size of SS1, SS2, SS3 and SS4 may be 8, the starting RB index for SS1 (e.g. SRB1) may be at least one of {0, 4, 8}, the starting RB index for SS2 (e.g. SRB2) may be at least one of {8, 12, 16}, the starting RB index for SS3 (e.g. SRB3) may be at least one of {16, 20, 24}, and the starting RB index for SS4 (e.g. SRB4) may be at least one of {24, 28, 32}. For example, at least two of SRB2-SRB1, SRB3-SRB2 and SRB4-SRB3 are larger than 8, for example are 12. For example, one of SRB2-SRB1, SRB3-SRB2 and SRB4-SRB3 is 16. As another example, all of SRB2-SRB1, SRB3-SRB2 and SRB4-SRB3 are no less than 8. As another example, the size of SS1, SS2, SS3 and SS4 may be 12, the starting RB index for SS1 (e.g. SRB1) may be 0, the starting RB index for SS2 (e.g. SRB2) may be at least one of {4, 8, 12}, the starting RB index for SS3 (e.g. SRB3) may be at least one of {16, 20, 24}, and the starting RB index for SS4 (e.g. SRB4) may be 28. For example, at least two of SRB2-SRB1, SRB3-SRB2 and SRB4-SRB3 are less than 12, for example are 8. For example, one of SRB2-SRB1, SRB3-SRB2 and SRB4-SRB3 is 4. As another example, all of SRB2-SRB1, SRB3-SRB2 and SRB4-SRB3 are no larger than 12.

In some embodiments, the size of first subband may be configured as $m_{SRS,B_{SRS}}$=44, and the configuration of a partial sounding may be configured as $P_F$=2. For example, the size of SS1 may be 20, and the size of SS2 may be 24, the starting RB index for SS1 may be 0, and the starting RB index for SS2 may be 20. As another example, the size of SS1 may be 24 and the size of SS2 may be 20, the starting RB index for SS1 may be 0, and the starting RB index for SS2 may be 24. As another example, the size of SS1 and SS2 may be 24, the starting RB index for SS1 and SS2 may be {0, 20}, respectively. As another example, the size of SS1 and SS2 may be 20, the starting RB index for SS1 and SS2 may be {0, 20} or {4, 24} or {0, 24}, respectively.

In some embodiments, the size of first subband may be configured as $m_{SRS,B_{SRS}}$=44, and the configuration of a partial sounding may be configured as $P_F$=4. For example, the size of SS1, SS2, SS3 and SS4 may be {8, 12, 12, 12} or {12, 8, 12, 12} or {12, 12, 8, 12} or {12, 12, 12, 8}, respectively, the starting RB index for SS1, SS2, SS3 and SS4 may be {0, 8, 20, 32} or {0, 12, 20, 32} or {0, 12, 24, 32} or {0, 12, 24, 36}, respectively. As another example, the size of SS1, SS2, SS3 and SS4 may be 12, the starting RB index for SS1, SS2, SS3 and SS4 may be {0, 12, 24, 32} or {0, 12, 20, 32} or {0, 8, 20, 32}, respectively.

In some embodiments, the size of first subband may be configured as $m_{SRS,B_{SRS}}$=52, and the configuration of a partial sounding may be configured as $P_F$=2. For example, the size of SS1 may be 28, and the size of SS2 may be 24, the starting RB index for SS1 may be 0, and the starting RB index for SS2 may be 28. As another example, the size of SS1 may be 24 and the size of SS2 may be 28, the starting RB index for SS1 may be 0, and the starting RB index for SS2 may be 24. As another example, the size of SS1 and SS2 may be 28, the starting RB index for SS1 and SS2 may be {0, 24}, respectively. As another example, the size of SS1 and SS2 may be 24, the starting RB index for SS1 and SS2 may be {0, 24} or {4, 28} or {0, 28}, respectively.

In some embodiments, the size of first subband may be configured as $m_{SRS,B_{SRS}}$=52, and the configuration of a partial sounding may be configured as $P_F$=4. For example, the size of SS1, SS2, SS3 and SS4 may be {16, 12, 12, 12} or {12, 16, 12, 12} or {12, 12, 16, 12} or {12, 12, 12, 16}, respectively, the starting RB index for SS1, SS2, SS3 and SS4 may be {0, 16, 28, 40} or {0, 12, 28, 40} or {0, 12, 24, 40} or {0, 12, 24, 36}, respectively. As another example, the size of SS1, SS2, SS3 and SS4 may be 12, the starting RB index for SS1, SS2, SS3 and SS4 may be {0, 16, 28, 40} or {0, 12, 28, 40} or {0, 12, 24, 40} or {0, 12, 24, 36} or {4, 16, 28, 40}, respectively.

In some embodiments, the size of first subband may be configured as $m_{SRS,B_{SRS}}$=56, and the configuration of a partial sounding may be configured as $P_F$=4. For example, the size of SS1, SS2, SS3 and SS4 may be {16, 16, 12, 12} or {16, 12, 12, 16} or {12, 12, 16, 16} or {12, 16, 12, 16} or {12, 16, 16, 12} or {16, 12, 16, 12}, respectively, the starting RB index for SS1, SS2, SS3 and SS4 may be {0, 16, 32, 44} or {0, 16, 28, 40} or {0, 12, 24, 40} or {0, 12, 28, 40} or {0, 12, 28, 44} or {0, 16, 28, 44}, respectively. As another example, the size of SS1, SS2, SS3 and SS4 may be 12, the starting RB index for SS1 (e.g. SRB1) may be at least one of {0, 4, 8}, the starting RB index for SS2 (e.g. SRB2) may be at least one of {12, 16, 20}, the starting RB index for SS3 (e.g. SRB3) may be at least one of {24, 28, 32}, and the starting RB index for SS4 (e.g. SRB4) may be at least one of {36, 40, 44}. For example, at least two of SRB2-SRB1, SRB3-SRB2 and SRB4-SRB3 are larger than 12, for example are 16. For example, one of SRB2-SRB1, SRB3-SRB2 and SRB4-SRB3 is 20. As another example, all of SRB2-SRB1, SRB3-SRB2 and SRB4-SRB3 are no less than 12. As another example, the size of SS1, SS2, SS3 and SS4 may be 16, the starting RB index for SS1 (e.g. SRB1) may be 0, the starting RB index for SS2 (e.g. SRB2) may be at least one of {8, 12, 16}, the starting RB index for SS3 (e.g. SRB3) may be at least one of {24, 28, 32}, and the starting RB index for SS4 (e.g. SRB4) may be 40. For example, at least two of SRB2-SRB1, SRB3-SRB2 and SRB4-SRB3 are less than 16, for example are 12. For example, one of SRB2-SRB1, SRB3-SRB2 and SRB4-SRB3 is 8. As another example, all of SRB2-SRB1, SRB3-SRB2 and SRB4-SRB3 are no larger than 16.

In some embodiments, the size of first subband may be configured as $m_{SRS,B_{SRS}}$=60, and the configuration of a partial sounding may be configured as $P_F$=2. For example, the size of SS1 may be 28, and the size of SS2 may be 32, the starting RB index for SS1 may be 0, and the starting RB index for SS2 may be 28. As another example, the size of SS1 may be 32 and the size of SS2 may be 28, the starting RB index for SS1 may be 0, and the starting RB index for SS2 may be 32. As another example, the size of SS1 and SS2 may be 32, the starting RB index for SS1 and SS2 may be {0, 28}, respectively. As another example, the size of SS1 and SS2 may be 28, the starting RB index for SS1 and SS2 may be {0, 32} or {4, 32} or {0, 28}, respectively.

In some embodiments, the size of first subband may be configured as $m_{SRS,B_{SRS}}$=60, and the configuration of a partial sounding may be configured as $P_F$=4. For example, the size of SS1, SS2, SS3 and SS4 may be {16, 16, 16, 12} or {16, 16, 12, 16} or {16, 12, 16, 16} or {12, 16, 16, 16}, respectively, the starting RB index for SS1, SS2, SS3 and SS4 may be {0, 16, 32, 48} or {0, 16, 32, 44} or {0, 16, 28, 44} or {0, 12, 28, 44}, respectively. As another example, the size of SS1, SS2, SS3 and SS4 may be 16, the starting RB index for SS1, SS2, SS3 and SS4 may be {0, 16, 32, 44} or {0, 16, 28, 44} or {0, 12, 28, 44}, respectively.

In some embodiments, the size of first subband may be configured as $m_{SRS,B_{SRS}}$=68, and the configuration of a partial sounding may be configured as $P_F$=2. For example, the size of SS1 may be 36, and the size of SS2 may be 32, the starting RB index for SS1 may be 0, and the starting RB index for SS2 may be 36. As another example, the size of SS1 may be 32 and the size of SS2 may be 36, the starting RB index for SS1 may be 0, and the starting RB index for SS2 may be 32. As another example, the size of SS1 and SS2 may be 36, the starting RB index for SS1 and SS2 may be {0, 32}, respectively. As another example, the size of SS1 and SS2 may be 32, the starting RB index for SS1 and SS2 may be {0, 32} or {4, 36} or {0, 36}, respectively.

In some embodiments, the size of first subband may be configured as $m_{SRS,B_{SRS}}$=68, and the configuration of a partial sounding may be configured as $P_F$=4. For example, the size of SS1, SS2, SS3 and SS4 may be {16, 16, 16, 20} or {16, 16, 20, 16} or {16, 20, 16, 16} or {20, 16, 16, 16}, respectively, the starting RB index for SS1, SS2, SS3 and SS4 may be {0, 16, 32, 48} or {0, 16, 32, 52} or {0, 16, 36, 52} or {0, 20, 36, 52}, respectively. As another example, the size of SS1, SS2, SS3 and SS4 may be 16, the starting RB index for SS1, SS2, SS3 and SS4 may be {0, 16, 32, 48} or {0, 16, 32, 52} or {0, 16, 36, 52} or {0, 20, 36, 52} or {4, 20, 36, 52}, respectively.

In some embodiments, the size of first subband may be configured as $m_{SRS,B_{SRS}}$=72, and the configuration of a partial sounding may be configured as $P_F$=4. For example, the size of SS1, SS2, SS3 and SS4 may be {16, 16, 20, 20} or {16, 20, 20, 16} or {20, 20, 16, 16} or {20, 16, 20, 16} or {20, 16, 16, 20} or {16, 20, 16, 20}, respectively, the starting RB index for SS1, SS2, SS3 and SS4 may be {0, 16, 32, 52} or {0, 16, 36, 56} or {0, 20, 40, 56} or {0, 20, 36, 56} or {0, 20, 36, 52} or {0, 16, 36, 52}, respectively. As another example, the size of SS1, SS2, SS3 and SS4 may be 16, the starting RB index for SS1 (e.g. SRB1) may be at least one of {0, 4, 8}, the starting RB index for SS2 (e.g. SRB2) may be at least one of {16, 20, 24}, the starting RB index for SS3 (e.g. SRB3) may be at least one of {32, 36, 40}, and the starting RB index for SS4 (e.g. SRB4) may be at least one of {48, 52, 56}. For example, at least two of SRB2-SRB1, SRB3-SRB2 and SRB4-SRB3 are larger than 16, for example are 20. For example, one of SRB2-SRB1, SRB3-SRB2 and SRB4-SRB3 is 24. As another example, all of SRB2-SRB1, SRB3-SRB2 and SRB4-SRB3 are no less than 16. As another example, the size of SS1, SS2, SS3 and SS4 may be 20, the starting RB index for SS1 (e.g. SRB1) may be 0, the starting RB index for SS2 (e.g. SRB2) may be at least one of {12, 16, 20}, the starting RB index for SS3 (e.g. SRB3) may be at least one of {32, 36, 40}, and the starting RB index for SS4 (e.g. SRB4) may be 52. For example, at least two of SRB2-SRB1, SRB3-SRB2 and SRB4-SRB3 are less than 20, for example are 16. For example, one of SRB2-SRB1, SRB3-SRB2 and SRB4-SRB3 is 12. As another example, all of SRB2-SRB1, SRB3-SRB2 and SRB4-SRB3 are no larger than 20.

In some embodiments, the size of first subband may be configured as $m_{SRS,B_{SRS}}=76$, and the configuration of a partial sounding may be configured as $P_F=2$. For example, the size of SS1 may be 40, and the size of SS2 may be 36, the starting RB index for SS1 may be 0, and the starting RB index for SS2 may be 40. As another example, the size of SS1 may be 36 and the size of SS2 may be 40, the starting RB index for SS1 may be 0, and the starting RB index for SS2 may be 36. As another example, the size of SS1 and SS2 may be 40, the starting RB index for SS1 and SS2 may be {0, 36}, respectively. As another example, the size of SS1 and SS2 may be 36, the starting RB index for SS1 and SS2 may be {0, 36} or {4, 40} or {0, 40}, respectively.

In some embodiments, the size of first subband may be configured as $m_{SRS,B_{SRS}}=76$, and the configuration of a partial sounding may be configured as $P_F=4$. For example, the size of SS1, SS2, SS3 and SS4 may be {20, 20, 20, 16} or {20, 16, 20, 20} or {16, 20, 20, 20} or {20, 20, 16, 20}, respectively, the starting RB index for SS1, SS2, SS3 and SS4 may be {0, 20, 40, 60} or {0, 20, 36, 56} or {0, 16, 36, 56} or {0, 20, 40, 56}, respectively. As another example, the size of SS1, SS2, SS3 and SS4 may be 20, the starting RB index for SS1, SS2, SS3 and SS4 may be {0, 20, 36, 56} or {0, 16, 36, 56} or {0, 20, 40, 56}, respectively.

In some embodiments, the size of first subband may be configured as $m_{SRS,B_{SRS}}=84$, and the configuration of a partial sounding may be configured as $P_F=2$. For example, the size of SS1 may be 44, and the size of SS2 may be 40, the starting RB index for SS1 may be 0, and the starting RB index for SS2 may be 44. As another example, the size of SS1 may be 40 and the size of SS2 may be 44, the starting RB index for SS1 may be 0, and the starting RB index for SS2 may be 40. As another example, the size of SS1 and SS2 may be 44, the starting RB index for SS1 and SS2 may be {0, 40}, respectively. As another example, the size of SS1 and SS2 may be 40, the starting RB index for SS1 and SS2 may be {0, 40} or {4, 44} or {0, 44}, respectively.

In some embodiments, the size of first subband may be configured as $m_{SRS,B_{SRS}}=84$, and the configuration of a partial sounding may be configured as $P_F=4$. For example, the size of SS1, SS2, SS3 and SS4 may be {20, 20, 20, 24} or {20, 24, 20, 20} or {24, 20, 20, 20} or {20, 20, 24, 20}, respectively, the starting RB index for SS1, SS2, SS3 and SS4 may be {0, 20, 40, 60} or {0, 20, 44, 64} or {0, 24, 44, 64} or {0, 20, 40, 64}, respectively. As another example, the size of SS1, SS2, SS3 and SS4 may be 20, the starting RB index for SS1, SS2, SS3 and SS4 may be {0, 20, 40, 60} or {0, 20, 44, 64} or {0, 24, 44, 64} or {0, 20, 40, 64} or {4, 24, 44, 64}, respectively.

In some embodiments, the size of first subband may be configured as $m_{SRS,B_{SRS}}=88$, and the configuration of a partial sounding may be configured as $P_F=4$. For example, the size of SS1, SS2, SS3 and SS4 may be {24, 24, 20, 20} or {24, 20, 20, 24} or {20, 20, 24, 24} or {20, 24, 20, 24} or {20, 24, 24, 20} or {24, 20, 24, 20}, respectively, the starting RB index for SS1, SS2, SS3 and SS4 may be {0, 24, 48, 68} or {0, 24, 44, 64} or {0, 20, 40, 64} or {0, 20, 44, 64} or {0, 20, 44, 68} or {0, 24, 44, 68}, respectively. As another example, the size of SS1, SS2, SS3 and SS4 may be 20, the starting RB index for SS1 (e.g. SRB1) may be at least one of {0, 4, 8}, the starting RB index for SS2 (e.g. SRB2) may be at least one of {20, 24, 28}, the starting RB index for SS3 (e.g. SRB3) may be at least one of {40, 44, 48}, and the starting RB index for SS4 (e.g. SRB4) may be at least one of {60, 64, 68}. For example, at least two of SRB2-SRB1, SRB3-SRB2 and SRB4-SRB3 are larger than 20, for example are 24. For example, one of SRB2-SRB1, SRB3-SRB2 and SRB4-SRB3 is 28. As another example, all of SRB2-SRB1, SRB3-SRB2 and SRB4-SRB3 are no less than 20. As another example, the size of SS1, SS2, SS3 and SS4 may be 24, the starting RB index for SS1 (e.g. SRB1) may be 0, the starting RB index for SS2 (e.g. SRB2) may be at least one of {16, 20, 24}, the starting RB index for SS3 (e.g. SRB3) may be at least one of {40, 44, 48}, and the starting RB index for SS4 (e.g. SRB4) may be 64. For example, at least two of SRB2-SRB1, SRB3-SRB2 and SRB4-SRB3 are less than 24, for example are 20. For example, one of SRB2-SRB1, SRB3-SRB2 and SRB4-SRB3 is 16. As another example, all of SRB2-SRB1, SRB3-SRB2 and SRB4-SRB3 are no larger than 24.

In some embodiments, the size of first subband may be configured as $m_{SRS,B_{SRS}}=92$, and the configuration of a partial sounding may be configured as $P_F=2$. For example, the size of SS1 may be 48, and the size of SS2 may be 44, the starting RB index for SS1 may be 0, and the starting RB index for SS2 may be 48. As another example, the size of SS1 may be 44 and the size of SS2 may be 48, the starting RB index for SS1 may be 0, and the starting RB index for SS2 may be 44. As another example, the size of SS1 and SS2 may be 48, the starting RB index for SS1 and SS2 may be {0, 44}, respectively. As another example, the size of SS1 and SS2 may be 44, the starting RB index for SS1 and SS2 may be {0, 44} or {4, 48} or {0, 48}, respectively.

In some embodiments, the size of first subband may be configured as $m_{SRS,B_{SRS}}=92$, and the configuration of a partial sounding may be configured as $P_F=4$. For example, the size of SS1, SS2, SS3 and SS4 may be {24, 24, 24, 20} or {24, 20, 24, 24} or {20, 24, 24, 24} or {24, 24, 20, 24}, respectively, the starting RB index for SS1, SS2, SS3 and SS4 may be {0, 24, 48, 72} or {0, 24, 44, 68} or {0, 20, 44, 68} or {0, 24, 48, 68}, respectively. As another example, the size of SS1, SS2, SS3 and SS4 may be 24, the starting RB index for SS1, SS2, SS3 and SS4 may be {0, 24, 44, 68} or {0, 20, 44, 68} or {0, 24, 48, 68}, respectively.

In some embodiments, the size of first subband may be configured as $m_{SRS,B_{SRS}}=104$, and the configuration of a partial sounding may be configured as $P_F=4$. For example, the size of SS1, SS2, SS3 and SS4 may be {24, 24, 28, 28} or {24, 28, 28, 24} or {28, 28, 24, 24} or {28, 24, 28, 24} or {28, 24, 24, 28} or {24, 28, 24, 28}, respectively, the starting RB index for SS1, SS2, SS3 and SS4 may be {0, 24, 48, 76} or {0, 24, 52, 80} or {0, 28, 56, 80} or {0, 28, 52, 80} or {0, 28, 52, 76} or {0, 24, 52, 76}, respectively. As another example, the size of SS1, SS2, SS3 and SS4 may be 24, the starting RB index for SS1 (e.g. SRB1) may be at least one of {0, 4, 8}, the starting RB index for SS2 (e.g. SRB2) may be at least one of {24, 28, 32}, the starting RB index for SS3 (e.g. SRB3) may be at least one of {48, 52, 56}, and the starting RB index for SS4 (e.g. SRB4) may be at least one of {64, 68, 72}. For example, at least two of SRB2-SRB1, SRB3-SRB2 and SRB4-SRB3 are larger than 24, for example are 28. For example, one of SRB2-SRB1, SRB3-SRB2 and SRB4-SRB3 is 32. As another example, all of SRB2-SRB1, SRB3-SRB2 and SRB4-SRB3 are no less than 24. As another example, the size of SS1, SS2, SS3 and SS4 may be 28, the starting RB index for SS1 (e.g. SRB1) may be 0, the starting RB index for SS2 (e.g. SRB2) may be at least one of {20, 24, 28}, the starting RB index for SS3 (e.g. SRB3) may be at least one of {48, 52, 56}, and the starting RB index for SS4 (e.g. SRB4) may be 76. For example, at least two of SRB2-SRB1, SRB3-SRB2 and SRB4-SRB3 are less than 28, for example are 24. For example, one of SRB2-SRB1, SRB3-SRB2 and SRB4-SRB3 is 20. As another example, all of SRB2-SRB1, SRB3-SRB2 and SRB4-SRB3 are no larger than 28.

In some embodiments, the size of first subband may be configured as $m_{SRS,B_{SRS}}$=108, and the configuration of a partial sounding may be configured as $P_F$=4. For example, the size of SS1, SS2, SS3 and SS4 may be {28, 28, 28, 24} or {28, 24, 28, 28} or {24, 28, 28, 28} or {28, 28, 24, 28}, respectively, the starting RB index for SS1, SS2, SS3 and SS4 may be {0, 28, 56, 84} or {0, 28, 52, 80} or {0, 24, 52, 80} or {0, 28, 56, 80}, respectively. As another example, the size of SS1, SS2, SS3 and SS4 may be 28, the starting RB index for SS1, SS2, SS3 and SS4 may be {0, 28, 52, 80} or {0, 24, 52, 80} or {0, 28, 56, 80}, respectively.

In some embodiments, the size of first subband may be configured as $m_{SRS,B_{SRS}}$=120, and the configuration of a partial sounding may be configured as $P_F$=4. For example, the size of SS1, SS2, SS3 and SS4 may be {32, 32, 28, 28} or {32, 28, 28, 32} or {28, 28, 32, 32} or {28, 32, 28, 32} or {28, 32, 32, 28} or {32, 28, 32, 28}, respectively, the starting RB index for SS1, SS2, SS3 and SS4 may be {0, 32, 64, 92} or {0, 32, 60, 88} or {0, 28, 56, 88} or {0, 28, 60, 88} or {0, 28, 60, 92} or {0, 32, 60, 92}, respectively. As another example, the size of SS1, SS2, SS3 and SS4 may be 28, the starting RB index for SS1 (e.g. SRB1) may be at least one of {0, 4, 8}, the starting RB index for SS2 (e.g. SRB2) may be at least one of {28, 32, 36}, the starting RB index for SS3 (e.g. SRB3) may be at least one of {56, 60, 64}, and the starting RB index for SS4 (e.g. SRB4) may be at least one of {84, 88, 92}. For example, at least two of SRB2-SRB1, SRB3-SRB2 and SRB4-SRB3 are larger than 28, for example are 32. For example, one of SRB2-SRB1, SRB3-SRB2 and SRB4-SRB3 is 36. As another example, all of SRB2-SRB1, SRB3-SRB2 and SRB4-SRB3 are no less than 28. As another example, the size of SS1, SS2, SS3 and SS4 may be 32, the starting RB index for SS1 (e.g. SRB1) may be 0, the starting RB index for SS2 (e.g. SRB2) may be at least one of {24, 28, 32}, the starting RB index for SS3 (e.g. SRB3) may be at least one of {56, 60, 64}, and the starting RB index for SS4 (e.g. SRB4) may be 88. For example, at least two of SRB2-SRB1, SRB3-SRB2 and SRB4-SRB3 are less than 32, for example are 28. For example, one of SRB2-SRB1, SRB3-SRB2 and SRB4-SRB3 is 24. As another example, all of SRB2-SRB1, SRB3-SRB2 and SRB4-SRB3 are no larger than 32.

In some embodiments, the size of first subband may be configured as $m_{SRS,B_{SRS}}$=132, and the configuration of a partial sounding may be configured as $P_F$=2. For example, the size of SS1 may be 68, and the size of SS2 may be 64, the starting RB index for SS1 may be 0, and the starting RB index for SS2 may be 68. As another example, the size of SS1 may be 64 and the size of SS2 may be 68, the starting RB index for SS1 may be 0, and the starting RB index for SS2 may be 64. As another example, the size of SS1 and SS2 may be 68, the starting RB index for SS1 and SS2 may be {0, 64}, respectively. As another example, the size of SS1 and SS2 may be 64, the starting RB index for SS1 and SS2 may be {0, 64} or {4, 68} or {0, 68}, respectively.

In some embodiments, the size of first subband may be configured as $m_{SRS,B_{SRS}}$=132, and the configuration of a partial sounding may be configured as $P_F$=4. For example, the size of $SS_1$, SS2, SS3 and SS4 may be {32, 32, 32, 36} or {32, 36, 32, 32} or {36, 32, 32, 32} or {32, 32, 36, 32}, respectively, the starting RB index for SS1, SS2, SS3 and SS4 may be {0, 32, 64, 96} or {0, 32, 68, 100} or {0, 36, 68, 100} or {0, 32, 64, 100}, respectively. As another example, the size of SS1, SS2, SS3 and SS4 may be 32, the starting RB index for SS1, SS2, SS3 and SS4 may be {0, 32, 64, 96} or {0, 32, 68, 100} or {0, 36, 68, 100} or {0, 32, 64, 100} or {4, 36, 68, 100}, respectively.

In some embodiments, the size of first subband may be configured as $m_{SRS,B_{SRS}}$=136, and the configuration of a partial sounding may be configured as $P_F$=4. For example, the size of SS1, SS2, SS3 and SS4 may be {32, 32, 36, 36} or {32, 36, 36, 32} or {36, 36, 32, 32} or {36, 32, 36, 32} or {36, 32, 32, 36} or {32, 36, 32, 36}, respectively, the starting RB index for SS1, SS2, SS3 and SS4 may be {0, 32, 64, 100} or {0, 32, 68, 104} or {0, 36, 72, 104} or {0, 36, 68, 104} or {0, 36, 68, 100} or {0, 32, 68, 100}, respectively. As another example, the size of SS1, SS2, SS3 and SS4 may be 32, the starting RB index for SS1 (e.g. SRB1) may be at least one of {0, 4, 8}, the starting RB index for SS2 (e.g. SRB2) may be at least one of {32, 36, 40}, the starting RB index for SS3 (e.g. SRB3) may be at least one of {64, 68, 72}, and the starting RB index for SS4 (e.g. SRB4) may be at least one of {96, 100, 104}. For example, at least two of SRB2-SRB1, SRB3-SRB2 and SRB4-SRB3 are larger than 32, for example are 36. For example, one of SRB2-SRB1, SRB3-SRB2 and SRB4-SRB3 is 40. As another example, all of SRB2-SRB1, SRB3-SRB2 and SRB4-SRB3 are no less than 32. As another example, the size of SS1, SS2, SS3 and SS4 may be 36, the starting RB index for SS1 (e.g. SRB1) may be 0, the starting RB index for SS2 (e.g. SRB2) may be at least one of {28, 32, 36}, the starting RB index for SS3 (e.g. SRB3) may be at least one of {64, 68, 72}, and the starting RB index for SS4 (e.g. SRB4) may be 100. For example, at least two of SRB2-SRB1, SRB3-SRB2 and SRB4-SRB3 are less than 36, for example are 32. For example, one of SRB2-SRB1, SRB3-SRB2 and SRB4-SRB3 is 28. As another example, all of SRB2-SRB1, SRB3-SRB2 and SRB4-SRB3 are no larger than 36.

In some embodiments, the size of first subband may be configured as $m_{SRS,B_{SRS}}$=152, and the configuration of a partial sounding may be configured as $P_F$=4. For example, the size of SS1, SS2, SS3 and SS4 may be {40, 40, 36, 36} or {40, 36, 36, 40} or {36, 36, 40, 40} or {36, 40, 36, 40} or {36, 40, 40, 36} or {40, 36, 40, 36}, respectively, the starting RB index for SS1, SS2, SS3 and SS4 may be {0, 40, 80, 116} or {0, 40, 76, 112} or {0, 36, 72, 112} or {0, 36, 76, 112} or {0, 36, 76, 116} or {0, 40, 76, 116}, respectively. As another example, the size of SS1, SS2, SS3 and SS4 may be 36, the starting RB index for SS1 (e.g. SRB1) may be at least one of {0, 4, 8}, the starting RB index for SS2 (e.g. SRB2) may be at least one of {36, 40, 44}, the starting RB index for SS3 (e.g. SRB3) may be at least one of {72, 76, 80}, and the starting RB index for SS4 (e.g. SRB4) may be at least one of {108, 112, 116}. For example, at least two of SRB2-SRB1, SRB3-SRB2 and SRB4-SRB3 are larger than 36, for example are 40. For example, one of SRB2-SRB1, SRB3-SRB2 and SRB4-SRB3 is 44. As another example, all of SRB2-SRB1, SRB3-SRB2 and SRB4-SRB3 are no less than 36. As another example, the size of SS1, SS2. SS3 and SS4 may be 40, the starting RB index for SS1 (e.g. SRB1) may be 0, the starting RB index for SS2 (e.g. SRB2) may be at least one of {32, 36, 40}, the starting RB index for SS3 (e.g. SRB3) may be at least one of {72, 76, 80}, and the starting RB index for SS4 (e.g. SRB4) may be 112. For example, at least two of SRB2-SRB1, SRB3-SRB2 and SRB4-SRB3 are less than 40, for example are 36. For example, one of SRB2-SRB1, SRB3-SRB2 and SRB4-SRB3 is 32. As another example, all of SRB2-SRB1, SRB3-SRB2 and SRB4-SRB3 are no larger than 40.

In some embodiments, the size of first subband may be configured as $m_{SRS,B_{SRS}}$=168, and the configuration of a partial sounding may be configured as $P_F$=4. For example, the size of SS1, SS2, SS3 and SS4 may be {40, 40, 44, 44} or {40, 44, 44, 40} or {44, 44, 40, 40} or {44, 40, 44, 40} or {44, 40, 40, 44} or {40, 44, 40, 44}, respectively; the starting RB index for SS1, SS2, SS3 and SS4 may be {0, 40, 80, 124} or {0, 40, 84, 128} or {0, 44, 88, 128} or {0, 44, 84, 128} or {0, 44, 84, 124} or {0, 40, 84, 124}, respectively. As another example, the size of SS1, SS2, SS3 and SS4 may be 40, the starting RB index for SS1 (e.g. SRB1) may be at least one of {0, 4, 8}, the starting RB index for SS2 (e.g. SRB2) may be at least one of {40, 44, 48}, the starting RB index for SS3 (e.g. SRB3) may be at least one of {80, 84, 88}, and the starting RB index for SS4 (e.g. SRB4) may be at least one of {120, 124, 128}. For example, at least two of SRB2-SRB1, SRB3-SRB2 and SRB4-SRB3 are larger than 40, for example are 44. For example, one of SRB2-SRB1, SRB3-SRB2 and SRB4-SRB3 is 48. As another example, all of SRB2-SRB1, SRB3-SRB2 and SRB4-SRB3 are no less than 40. As another example, the size of SS1, SS2, SS3 and SS4 may be 44, the starting RB index for SS1 (e.g. SRB1) may be 0, the starting RB index for SS2 (e.g. SRB2) may be at least one of {36, 40, 44}, the starting RB index for SS3 (e.g. SRB3) may be at least one of {80, 84, 88}, and the starting RB index for SS4 (e.g. SRB4) may be 124. For example, at least two of SRB2-SRB1, SRB3-SRB2 and SRB4-SRB3 are less than 44, for example are 40. For example, one of SRB2-SRB1, SRB3-SRB2 and SRB4-SRB3 is 36. As another example, all of SRB2-SRB1, SRB3-SRB2 and SRB4-SRB3 are no larger than 44.

In some embodiments, the size of first subband may be configured as $m_{SRS,B_{SRS}}$=184, and the configuration of a partial sounding may be configured as $P_F$=4. For example, the size of SS1, SS2, SS3 and SS4 may be {48, 48, 44, 44} or {48, 44, 44, 48} or {44, 44, 48, 48} or {44, 48, 44, 48} or {44, 48, 48, 44} or {48, 44, 48, 44}, respectively, the starting RB index for SS1, SS2, SS3 and SS4 may be {0, 48, 96, 140} or {0, 48, 92, 136} or {0, 44, 88, 136} or {0, 44, 92, 136} or {0, 44, 92, 140} or {0, 48, 92, 140}, respectively. As another example, the size of SS1, SS2, SS3 and SS4 may be 44, the starting RB index for SS1 (e.g. SRB1) may be at least one of {0, 4, 8}, the starting RB index for SS2 (e.g. SRB2) may be at least one of {44, 48, 52}, the starting RB index for SS3 (e.g. SRB3) may be at least one of {88, 92, 96}, and the starting RB index for SS4 (e.g. SRB4) may be at least one of {132, 136, 140}. For example, at least two of SRB2-SRB1, SRB3-SRB2 and SRB4-SRB3 are larger than 44, for example are 48. For example, one of SRB2-SRB1. SRB3-SRB2 and SRB4-SRB3 is 52. As another example, all of SRB2-SRB1, SRB3-SRB2 and SRB4-SRB3 are no less than 44. As another example, the size of SS1, SS2, SS3 and SS4 may be 48, the starting RB index for SS1 (e.g. SRB1) may be 0, the starting RB index for SS2 (e.g. SRB2) may be at least one of {40, 44, 48}, the starting RB index for SS3 (e.g. SRB3) may be at least one of {88, 92, 96}, and the starting RB index for SS4 (e.g. SRB4) may be 136. For example, at least two of SRB2-SRB1, SRB3-SRB2 and SRB4-SRB3 are less than 48, for example are 44. For example, one of SRB2-SRB1, SRB3-SRB2 and SRB4-SRB3 is 40. As another example, all of SRB2-SRB1, SRB3-SRB2 and SRB4-SRB3 are no larger than 48.

In some embodiments, the size of first subband may be configured as $m_{SRS,B_{SRS}}$=216, and the configuration of a partial sounding may be configured as $P_F$=4. For example, the size of SS1, SS2, SS3 and SS4 may be {56, 56, 52, 52} or {56, 52, 56, 52} or {52, 52, 56, 56} or {52, 56, 52, 56} or {52, 56, 56, 52} or {56, 52, 56, 52}, respectively, the starting RB index for SS1, SS2, SS3 and SS4 may be {0, 56, 118, 160} or {0, 56, 108, 164} or {0, 52, 104, 160} or {0, 52, 108, 164} or {0, 52, 108, 164} or {0, 56, 108, 164}, respectively. As another example, the size of SS1, SS2, SS3 and SS4 may be 52, the starting RB index for SS1 (e.g. SRB1) may be at least one of {0, 4, 8}, the starting RB index for SS2 (e.g. SRB2) may be at least one of {52, 56, 60}, the starting RB index for SS3 (e.g. SRB3) may be at least one of {104, 108, 112}, and the starting RB index for SS4 (e.g. SRB4) may be at least one of {156, 160, 164}. For example, at least two of SRB2-SRB1, SRB3-SRB2 and SRB4-SRB3 are larger than 52, for example are 56. For example, one of SRB2-SRB1, SRB3-SRB2 and SRB4-SRB3 is 60. As another example, all of SRB2-SRB1, SRB3-SRB2 and SRB4-SRB3 are no less than 52. As another example, the size of SS1, SS2, SS3 and SS4 may be 56, the starting RB index for SS1 (e.g. SRB1) may be 0, the starting RB index for SS2 (e.g. SRB2) may be at least one of {48, 52, 56}, the starting RB index for SS3 (e.g. SRB3) may be at least one of {104, 108, 112}, and the starting RB index for SS4 (e.g. SRB4) may be 160. For example, at least two of SRB2-SRB1, SRB3-SRB2 and SRB4-SRB3 are less than 56, for example are 52. For example, one of SRB2-SRB1, SRB3-SRB2 and SRB4-SRB3 is 48. As another example, all of SRB2-SRB1, SRB3-SRB2 and SRB4-SRB3 are no larger than 56.

In some embodiments, the size of first subband may be configured as $m_{SRS,B_{SRS}}$=264, and the configuration of a partial sounding may be configured as $P_F$=4. For example, the size of SS1, SS2, SS3 and SS4 may be {68, 68, 64, 64} or {68, 64, 68, 64} or {64, 64, 68, 68} or {64, 68, 64, 68} or {64, 68, 68, 64} or {68, 64, 68, 64}, respectively, the starting RB index for SS1, SS2, SS3 and SS4 may be {0, 68, 136, 200} or {0, 68, 132, 200} or {0, 64, 128, 196} or {0, 64, 132, 196} or {0, 64, 132, 200} or {0, 68, 132, 200}, respectively. As another example, the size of SS1, SS2, SS3 and SS4 may be 64, the starting RB index for SS1 (e.g. SRB1) may be at least one of {0, 4, 8}, the starting RB index for SS2 (e.g. SRB2) may be at least one of {64, 68, 72}, the starting RB index for SS3 (e.g. SRB3) may be at least one of {128, 132, 136}, and the starting RB index for SS4 (e.g. SRB4) may be at least one of {192, 196, 200}. For example, at least two of SRB2-SRB1, SRB3-SRB2 and SRB4-SRB3 are larger than 64, for example are 68. For example, one of SRB2-SRB1, SRB3-SRB2 and SRB4-SRB3 is 72. As another example, all of SRB2-SRB1, SRB3-SRB2 and SRB4-SRB3 are no less than 64. As another example, the size of SS1, SS2, SS3 and SS4 may be 68, the starting RB index for SS1 (e.g. SRB1) may be 0, the starting RB index for SS2 (e.g. SRB2) may be at least one of {60, 64, 68}, the starting RB index for SS3 (e.g. SRB3) may be at least one of {128, 132, 136}, and the starting RB index for SS4 (e.g. SRB4) may be 196. For example, at least two of SRB2-SRB1, SRB3-SRB2 and SRB4-SRB3 are less than 68, for example are 64. For example, one of SRB2-SRB1, SRB3-SRB2 and SRB4-SRB3 is 60. As another example, all of SRB2-SRB1, SRB3-SRB2 and SRB4-SRB3 are no larger than 68.

In some embodiments, if $$\frac{1}{P_F} * m_{SRS,B_{SRS}}$$

is not an integer multiple of four (for example $$\left(\frac{1}{P_F} * m_{SRS,B_{SRS}}\right) \bmod 4 \neq 0\Big),$$

the size of the second subband is a round number of $$\frac{1}{P_F} * m_{SRS,B_{SRS}}$$

which is an integer multiple of four or the size of the second subband is an integer multiple of four which is nearest to $$\frac{1}{P_F} * m_{SRS,B_{SRS}}.$$

The parameter "$P_F$" can represent a partial frequency indicated in the second configuration. The parameter "$m_{SRS}$" can represent a number of physical resource blocks indicated in the first configuration and the parameter "$B_{SRS}$" can represent a bandwidth parameter of sounding reference signal indicated in the first configuration. For example, $m_{SRS,B_{SRS}}$ may be the size of the first subband. In some embodiments, for example when $P_F$ is configured to be 2, the terminal device 110-1 can determine a first size of a first portion of the second subband to be an upper round of multiple of four. Alternatively or in addition, the terminal device 110-1 can determine a second size of a second portion of the second subband to be a lower round of multiple of four. For example, the first size can be upper round or ceil or round up of multiple of 4 nearest to $$\frac{1}{P_F} * m_{SRS,B_{SRS}}, \text{ e.g. } \operatorname{ceil}\left(\frac{1}{P_F} * m_{SRS,B_{SRS}}/4\right) * 4,$$

and the second size can be lower round or floor or round down of multiple of 4 nearest to $$\frac{1}{P_F} * m_{SRS,B_{SRS}}, \text{ e.g. } \operatorname{floor}\left(\frac{1}{P_F} * m_{SRS,B_{SRS}}/4\right) * 4$$

or the second size can be $$\frac{1}{P_F} * m_{SRS,B_{SRS}} - \operatorname{ceil}\left(\frac{1}{P_F} * m_{SRS,B_{SRS}}/4\right) * 4.$$

As another example, the first size can be lower round or floor or round down of multiple of 4 nearest to $$\frac{1}{P_F} * m_{SRS,B_{SRS}}, \text{ e.g. } \operatorname{floor}\left(\frac{1}{P_F} * m_{SRS,B_{SRS}}/4\right) * 4,$$

and the second size can be upper round or ceil or round up of multiple of 4 nearest to $$\frac{1}{P_F} * m_{SRS,B_{SRS}}, \text{ e.g. } \operatorname{ceil}\left(\frac{1}{P_F} * m_{SRS,B_{SRS}}/4\right) * 4$$

or the second size can be $$\frac{1}{P_F} * m_{SRS,B_{SRS}} - \operatorname{floor}\left(\frac{1}{P_F} * m_{SRS,B_{SRS}}/4\right) * 4.$$

In some embodiments, if the partial frequency is 2, the first one of partial sounding subband value is upper round of multiple of 4, e.g $$\operatorname{ceil}\left(\frac{1}{P_F} * m_{SRS,B_{SRS}}/4\right) * 4,$$

and the second one of partial sounding subband value is $$m_{SRS,B_{SRS}} - \operatorname{ceil}\left(\frac{1}{P_F} * m_{SRS,B_{SRS}}/4\right) * 4 * (P_F - 1) \text{ or}$$

$$\operatorname{floor}\left(\frac{1}{P_F} * m_{SRS,B_{SRS}}/4\right) * 4.$$

Figure 3:
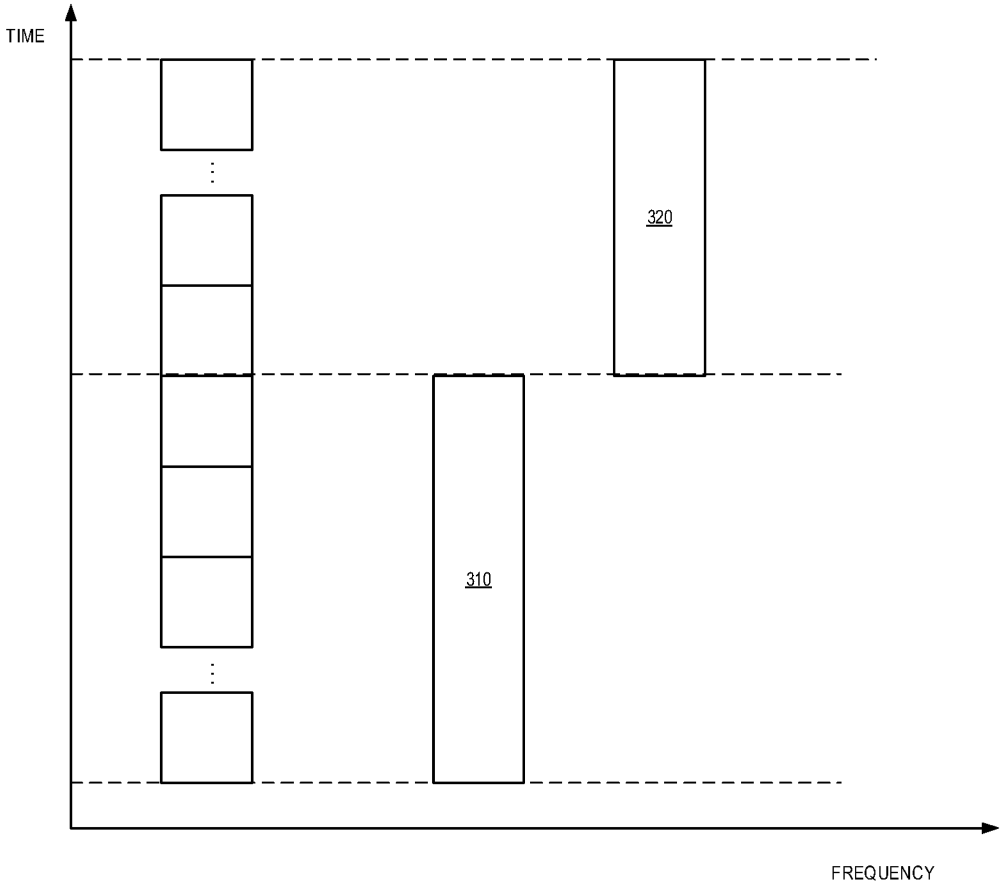
FIG. 3 illustrates a schematic diagram of partial sounding reference signals according to some embodiments of the present disclosure.

Only as an example, as shown in FIG. 3, the subband for SRS is configured as 52, and if $P_F$ is 2, the size of the subband 310 for partial sounding is 28 PRBs, and the size of the subband 320 for partial sounding is 24 PRBs. The start RB index of the RBs for each partial frequency sounding subband in the $m_{SRS,B_{SRS}}$ RBs can be $$N_{offset} = k_F * \text{ceil/round}\left(\frac{1}{P_F} * m_{SRS,B_{SRS}}/4\right) * 4,$$

where $k_F$ is from {0, 1, , . . . $P_F$−1}, and $N_{offset}$ represents the index of the start resource block, and ceil/round represents an upper round value.

Figure 4:
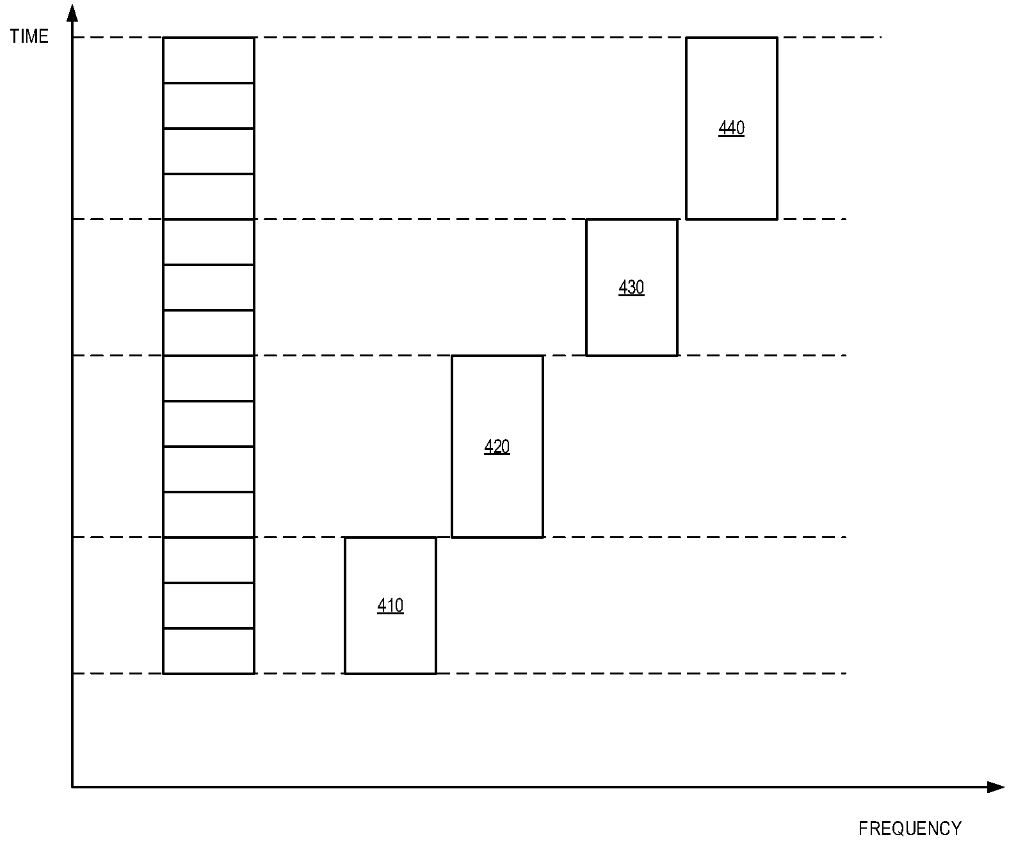
FIG. 4 illustrates a schematic diagram of partial sounding reference signals according to some embodiments of the present disclosure.

In other embodiments, taken X in present of round $$\frac{1}{P_F} * m_{SRS,B_{SRS}}/4\Big) * 4,$$

if the partial frequency is four and $|(m_{SRS,B_{SRS}} - )/4|$ equals to 1, one partial subband (e.g. first or second or third or fourth)

can be $m_{SRS,B_{SRS}}-X*3$, and the other three partial subbands can be X. Alternatively or in addition, if $|(m_{SRS,B_{SRS}}-X)/4|$ equals to 2, two partial subbands (e.g. first/second or first/third or second/fourth or third/fourth) can be $(m_{SRS,B_{SRS}}-X*2)/2$, and the other two partial bands are X. For example, the subband for SRS can be configured as 52, and if $P_F$ is 4, one of the partial subband is 16, and the remaining three partial subbands are 12. Alternatively, the subband for SRS can be configured as 56, and if $P_F$ is 4, two of the partial subbands are 16, and the remaining two partial subbands are 12. Only as an example, as shown in FIG. 4, the size of the subband for SRS is configured as 56 PRBs, and if $P_F$ is 4, the size of the subband 410 for partial sounding can be 12 PRBs, the size of the subband 420 can be 16 PRBs, the size of the subband 430 can be 12 PRBs, and the size of the subband 440 can be 16 PRBs. The start RB index of the RBs for each partial frequency sounding subband in the $m_{SRS,B_{SRS}}$ RBs can be:

$$N_{offset} = \sum\nolimits_{i=0}^{k_F} S_i,$$

where $S_i$ is the size of the i-th partial band, and $k_F=\{0, 1, \ldots P_F-1\}$.

In some embodiments, the start RB index of the subband for partial sounding can be aligned with unit of 4 PRBs. In this case, in an example embodiment, the value of each partial sounding subband can be upper round of multiple of 4, for example, $$\text{ceil}\left(\frac{1}{P_F} * m_{SRS,B_{SRS}}/4\right) * 4.$$

Figure 5:
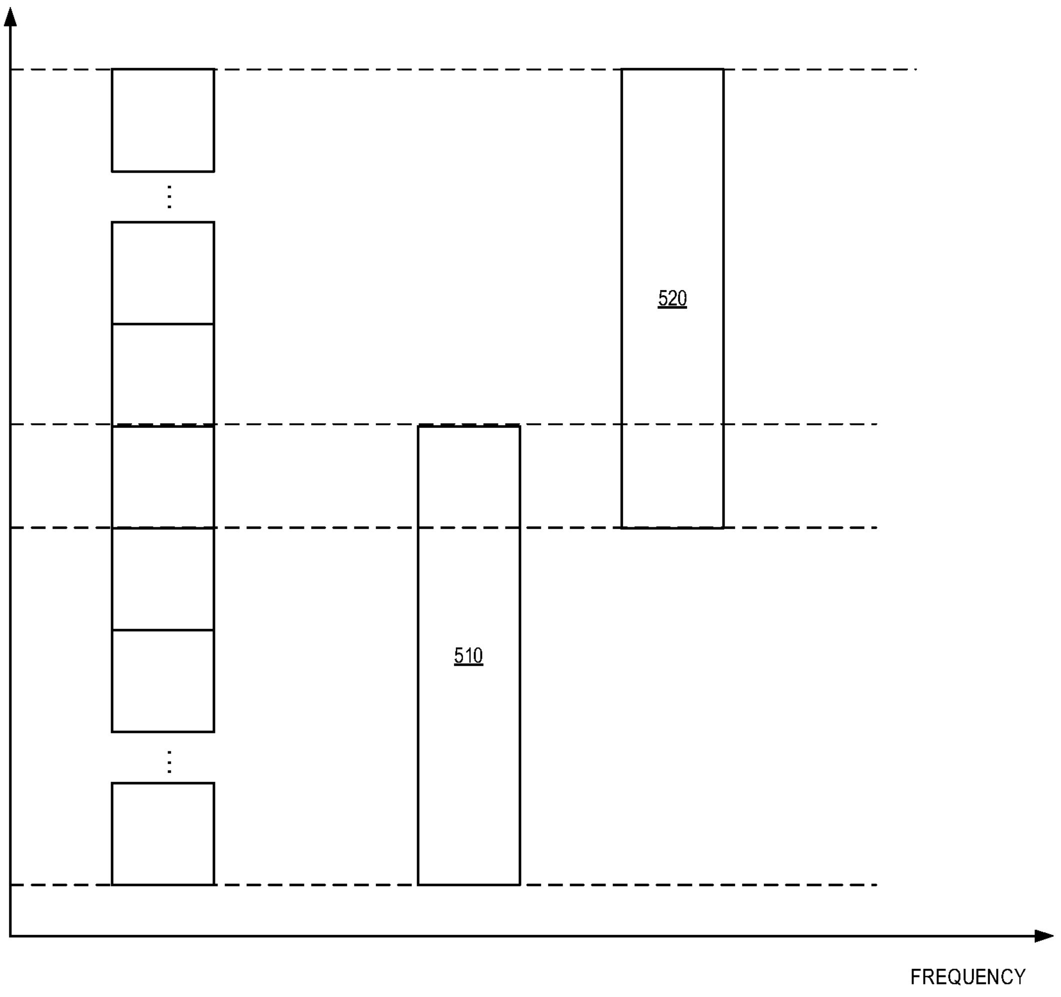
FIG. 5 illustrates a schematic diagram of partial sounding reference signals according to some embodiments of the present disclosure.

In some embodiments, the subband for SRS can be configured as 52, and if $P_F$ is 2, each subband for partial sounding can be 28. For example, as shown in FIG. 5, the subband for the SRS can be 52 PRBs and if the partial frequency is 2, the size of the subband 510 and the size of the subband 520 can be 28 PRBs. In this situation, there can be 4 PRBs overlapped for the two subbands for partial sounding. The start RB index of the RBs for each partial frequency sounding subband in the $m_{SRS,B_{SRS}}$ RBs can be 0, $$\text{ceil}\left(\frac{1}{P_F} * m_{SRS,B_{SRS}}/4\right) * 4 - 4$$

for the 1st and 2nd partial subband, respectively.

Alternatively, if the start RB index of the subband for partial sounding is aligned with unit of 4 PRBs, the value of each partial sounding subband can be lower round of multiple of 4, e.g.

$$X = \text{floor}\left(\frac{1}{P_F} * m_{SRS,B_{SRS}}/4\right) * 4.$$

Figure 6:
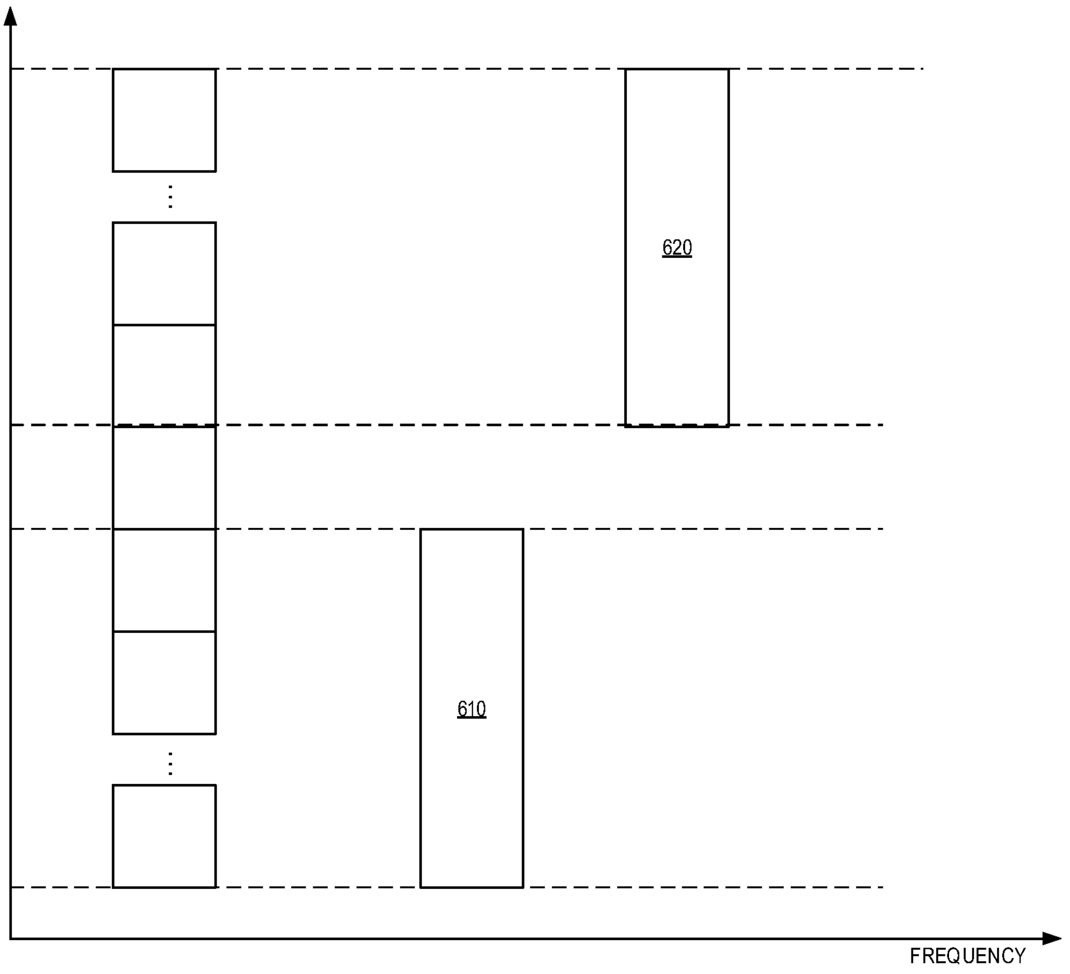
FIG. 6 illustrates a schematic diagram of partial sounding reference signals according to some embodiments of the present disclosure.

In some embodiments, the subband for SRS can be configured as 52, and if $P_F$ is 2, each subband for partial sounding is 24. For example, as shown in FIG. 6, the size of the subband for the SRS can be 52 PRBs and if the partial frequency is 2, the size of the subband 610 and the size of the subband 620 can be 24 PRBs. In this situation, there can be 4 PRBs not covered for the two subbands for partial sounding. The start RB index of the RBs for each partial frequency sounding subband in the $m_{SRS,B_{SRS}}$ RBs can be 0, $$\text{floor}\left(\frac{1}{P_F} * m_{SRS,B_{SRS}}/4\right) * 4 + 4$$

for the 1st and 2nd partial subband, respectively.

In other embodiments, the start RB index of the RBs for each partial subband may be changed based on a parameter, e.g. predefined or configured or based on slot/subframe index. The start RB index of the RBs for each partial frequency sounding subband in the $m_{SRS,B_{SRS}}$ RBs can be one of $$\left\{0, \text{floor}\left(\frac{1}{P_F} * m_{SRS,B_{SRS}}/4\right) * 4\right\},$$
$$\left\{0, \text{floor}\left(\frac{1}{P_F} * m_{SRS,B_{SRS}}/4\right) * 4 + 4\right\},$$
$$\left\{4, \mathit{floo}\ \frac{1}{P_F} * m_{SRS,B_{SRS}}/4\right) * 4 + 4\right\}$$

based on the parameter for the 1st and 2nd partial subband, respectively.

Figure 7A:
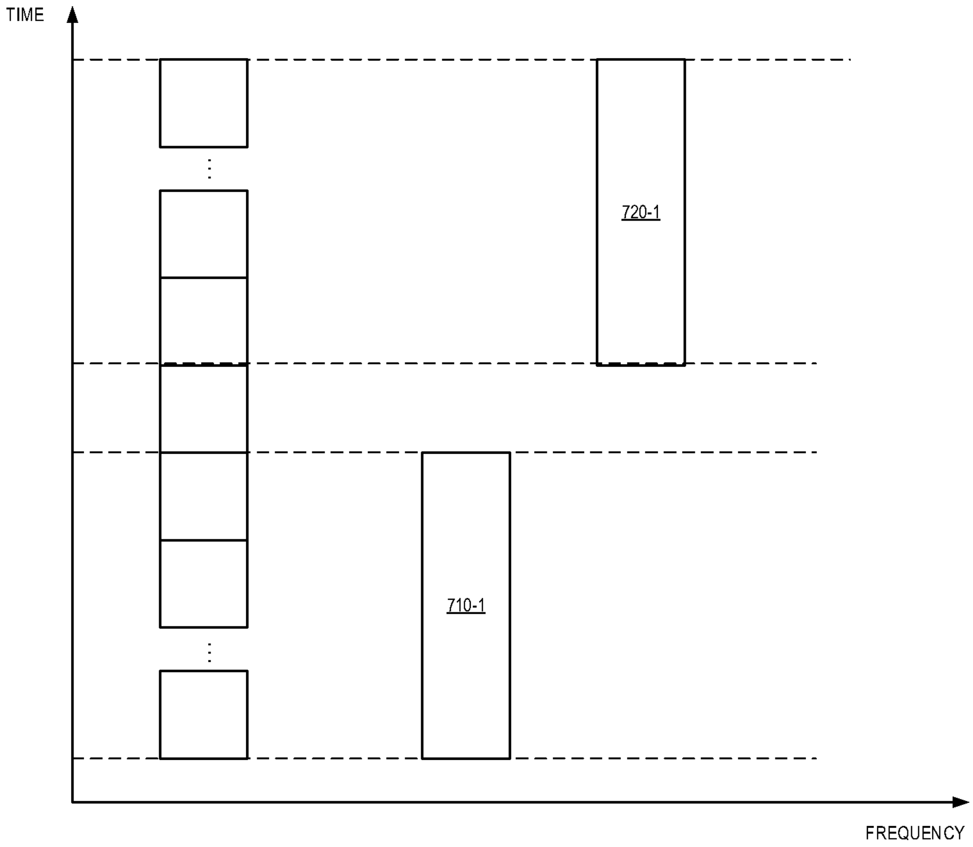
FIGS. 7A-7C illustrate schematic diagrams of partial sounding reference signals according to some embodiments of the present disclosure.
Figure 7B:
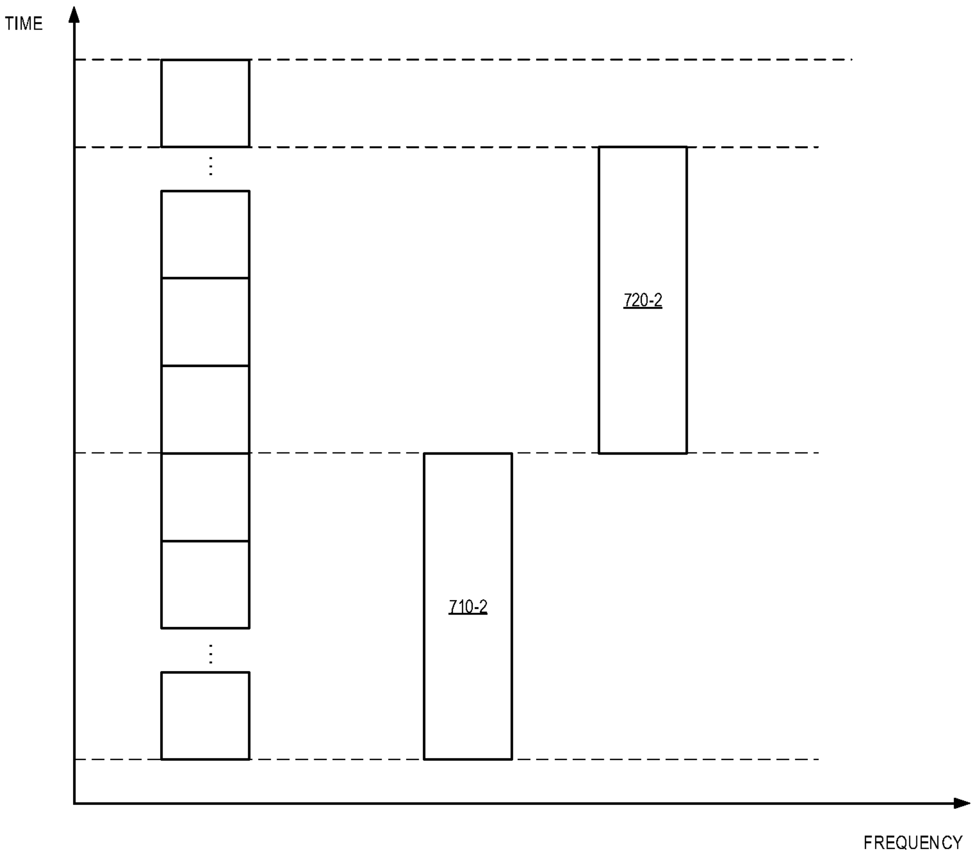
Figure 7C:
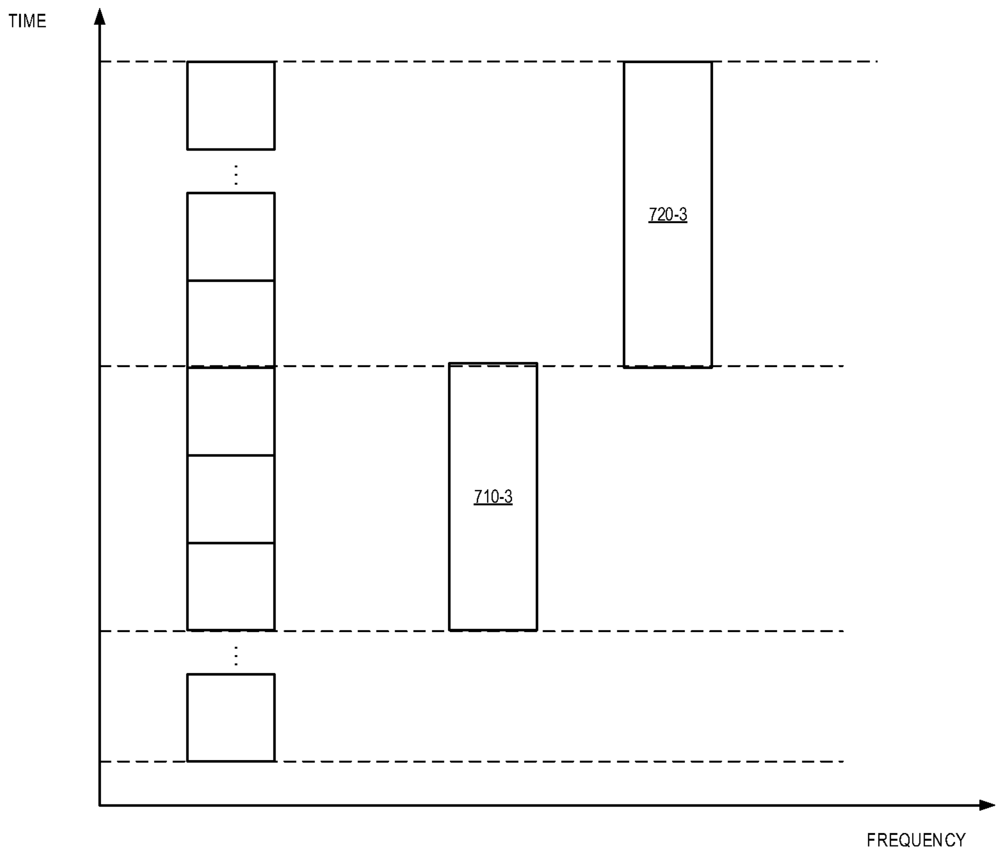

For example, as shown in FIGS. 7A-7C, the size of the subband for the SRS can be 52 PRBs. As shown in FIG. 7A, the start RB index of the subband 710-1 can be 0 and the start index of the subband 720-1 can be $$\mathit{floo}\ \frac{1}{P_F} * m_{SRS,B_{SRS}}/4\right).$$

The size of the subband 710-1 and the size of the suband 720-1 can be 24 PRBs. Alternatively, as shown in FIG. 7B, the start RB index of the subband 710-2 can be 0 and the start index of the subband 720-2 can be $$\mathit{floo}\ \frac{1}{P_F} * m_{SRS,B_{SRS}}/4\right) + 4.$$

The size of the subband 710-2 and the size of the suband 720-2 can be 24 PRBs. In other embodiments, as shown in FIG. 7C, the start RB index of the subband 710-3 can be 4 and the start index of the subband 720-3 can be $$\text{floor}\left(\frac{1}{P_F} * m_{SRS,B_{SRS}}/4\right) + 4.$$

The size of the subband 710-3 and the size of the suband 720-2 can be 24 PRBs.

Alternatively, the value of each partial sounding subband can be round of multiple of 4, e.g.

$$X = \text{round}\left(\frac{1}{P_F} * m_{SRS,B_{SRS}}/4\right) * 4.$$

In some embodiments, if $|(m_{SRS,B_{SRS}}-X)/4$ is 1, the overlapped 4RBs or non-covered 4RBs are between the $$\left(\frac{P_F}{2}-1\right)\text{-}th$$

and $P_F/2$-th partial subbands. Alternatively, if $|(m_{SRS,B_{SRS}}-X)/4|=2$ is 2, 4 overlapped/non-covered RBs between 1st and 2nd partial subbands, and another 4 overlapped/non-covered RBs between 3rd and 4th partial subbands. The start RB index of the RBs for each partial frequency sounding subband in the $m_{SRS,B_{SRS}}$ RBs can be $$N_{offset}=\begin{cases} k_F*X+\left\lfloor (k_F+1)/\left(\frac{P_F}{2}\right)\right\rfloor*(m_{SRS,B_{SRS}}-X)/2, & \text{if } \left|(m_{SRS,B_{SRS}}-X)/4\right|=2 \\ k_F*X+\lfloor k_F/(P_F/2)\rfloor*(m_{SRS,B_{SRS}}-X), & \text{otherwise} \end{cases},$$

$$\text{where } k_F=\{0,1,\ldots,P_F-1\}.$$

$K_{TC}$ being 4 or 8 cannot be configured simultaneously. $P_F$ being 2 and $K_{TC}$ being 8 cannot be configured simultaneously. The maximum number of the cyclic shift can be determined based on Table 1.

TABLE 1

| $K_{TC}*P_F$ | $n_{SRS}^{cs,max}$ |
|---|---|
| 2 | 8 |
| 4 | 12 |
| 8 | 6 |

Figure 8:
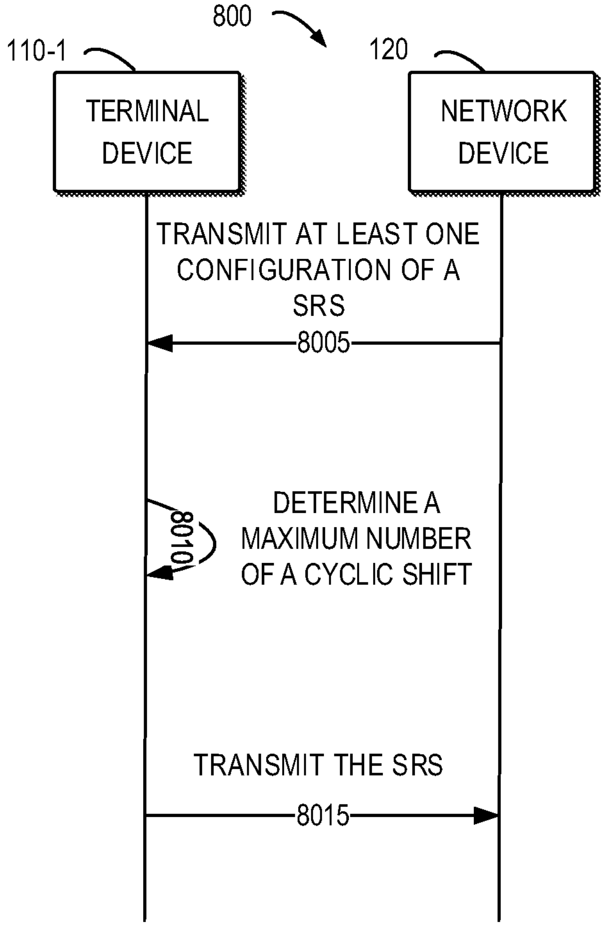
FIG. 8 illustrates a signaling flow of transmitting a sounding reference signal according to some embodiments of the present disclosure.

FIG. 8 shows a signaling chart illustrating process 800 among devices according to some example embodiments of the present disclosure. Only for the purpose of discussion, the process 800 will be described with reference to FIG. 1. The process 800 may involve the terminal device 110-1, the network device 120 in FIG. 1. It should be noted that the process 800 is only an example not limitation.

The network device 120 transmits 8005 at least one configuration of a SRS to the terminal device 110-1. The configuration comprises a first configuration of a first subband and a second configuration of a partial sounding. In some embodiments, the first configuration can comprise a number of physical resource blocks. Alternatively or in addition, the first configuration can comprise a bandwidth parameter of sounding reference signal ($B_{SRS}$). The second configuration can comprise a partial frequency ($P_F$).

The terminal device 110-1 determines 8010 a maximum number of a cyclic shift based on a comb parameter and the second configuration. In some embodiments, the maximum number of the cyclic shift is determined based on a product of a value of the comb parameter and a value of the second configuration.

In some embodiments, the maximum number of the cyclic shift is at least one of: 8, when the value of comb parameter is 2 and the value of second configuration is 1; 12, when the value of comb parameter is 2 and the value of second configuration is 2; 6, when the value of comb parameter is 2 and the value of second configuration is 4 or when the value of comb parameter is 4 and the value of second configuration is 2; and 3, when the value of comb parameter is 4 and the value of second configuration is 4 or when the value of comb parameter is 2 and the value of second configuration is 8 or when the value of comb parameter is 8 and the value of second configuration is 2.

For example, the maximum number of cyclic shift can be determined based on value of KTC and value of $P_F$ or value of $$\frac{1}{P_F}*m_{SRS,B_{SRS}}.$$

In some embodiments, the maximum number of cyclic shift can be a function of $K_{TC}*P_F$. For example, $P_F$ being 4 and Alternatively or in addition, the maximum number of cyclic shift can be a function of $K_{TC}$ and $$\frac{1}{P_F}*m_{SRS,B_{SRS}}.$$

For example, when the value of $$\frac{1}{P_F}*m_{SRS,B_{SRS}}$$

is odd integer, KTC may be {2} or {2, 4}, as shown in Tables 2 and 3.

TABLE 2

| $K_{TC}$ | $n_{SRS}^{cs,max}$ |
|---|---|
| 2 | 6 |

TABLE 3

| $K_{TC}$ | $n_{SRS}^{cs,max}$ |
|---|---|
| 2 | 6 |
| 4 | 3 |

In other embodiments, when the value of $$\frac{1}{P_F}*m_{SRS,B_{SRS}}$$

is even integer and multiple of 2 but not multiple of 4, KTC may be {2, 4} or {2, 4, 8}, as shown in Tables 4 and 5.

TABLE 4

| $K_{TC}$ | $n_{SRS}^{cs,max}$ |
|---|---|
| 2 | 12 |
| 4 | 6 |

TABLE 5

| $K_{TC}$ | $n_{SRS}^{cs,max}$ |
|---|---|
| 2 | 12 |
| 4 | 6 |
| 8 | 3 |

Alternatively or in addition, when the value of $$\frac{1}{P_F} * m_{SRS,B_{SRS}}$$

is multiple of 4, KTC may be {2, 4, 8}, as shown in Table 6.

TABLE 6

| $K_{TC}$ | $n_{SRS}^{cs,max}$ |
|---|---|
| 2 | 8 |
| 4 | 12 |
| 8 | 6 |

Alternatively or in addition, the maximum number of the cyclic shift is determined based on the comb parameter and a size of a second subband, and the size is determined based on the first and the second configuration. For example, the maximum number of cyclic shift is a function of sequence length. In some embodiments, when the value of $$\frac{1}{P_F} * m_{SRS,B_{SRS}}$$

is odd integer, KTC may be {2} or {2, 4}, as shown in Tables 7 and 8.

TABLE 7

| $K_{TC}$ | $n_{SRS}^{cs,max}$ |
|---|---|
| 2 | 6 |

TABLE 8

| $K_{TC}$ | $n_{SRS}^{cs,max}$ |
|---|---|
| 2 | 6 |
| 4 | 3 |

In other embodiments, when the value of $$\frac{1}{P_F} * m_{SRS,B_{SRS}}$$

is even integer and multiple of 2 but not multiple of 4, KTC may be {2, 4} or {2, 4, 8}, as shown in Tables 9 and 10.

TABLE 9

| $K_{TC}$ | $n_{SRS}^{cs,max}$ |
|---|---|
| 2 | 12 |
| 4 | 6 |

TABLE 10

| $K_{TC}$ | $n_{SRS}^{cs,max}$ |
|---|---|
| 2 | 12 |
| 4 | 6 |
| 8 | 3 |

As an example embodiment, when the value of $$\frac{1}{P_F} * m_{SRS,B_{SRS}}$$

is a multiple of 4, KTC may be {2, 4, 8}, as shown in Table 11.

TABLE 11

| $K_{TC}$ | $n_{SRS}^{cs,max}$ |
|---|---|
| 2 | 8 |
| 4 | 12 |
| 8 | 6 |

The terminal device 110-1 transmits 8015 the SRS based on the maximum number of the cyclic shift, the first and second configurations.

Figure 9:
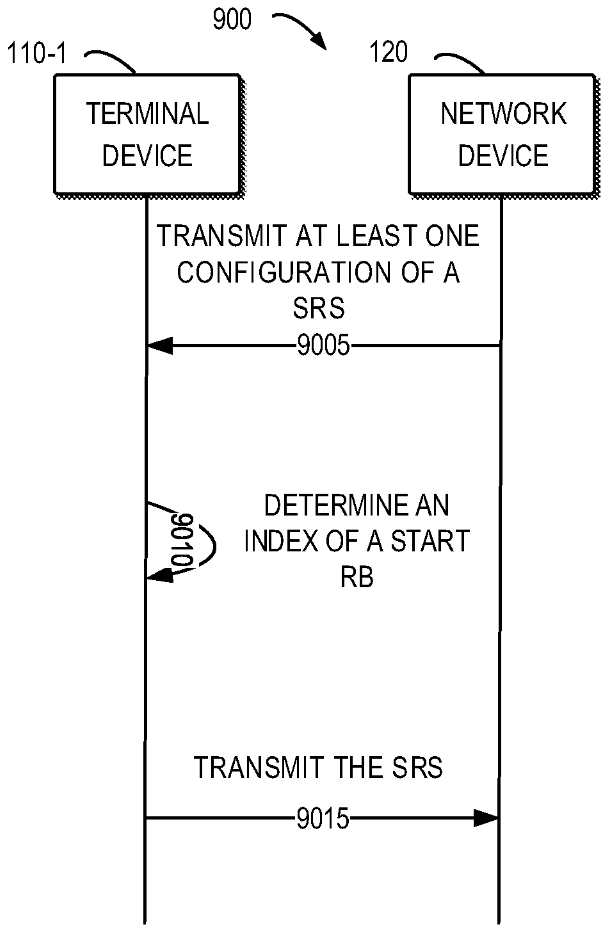
FIG. 9 illustrates a signaling flow of transmitting a sounding reference signal according to some embodiments of the present disclosure.

FIG. 9 shows a signaling chart illustrating process 900 among devices according to some example embodiments of the present disclosure. Only for the purpose of discussion, the process 900 will be described with reference to FIG. 1. The process 900 may involve the terminal device 110-1, the network device 120 in FIG. 1. It should be noted that the process 900 is only an example not limitation.

The network device 120 transmits 9005 at least one configuration of a SRS to the terminal device 110-1. The configuration comprises a first configuration of a first subband and a second configuration of a partial sounding. In some embodiments, the first configuration can comprise a number of physical resource blocks. Alternatively or in addition, the first configuration can comprise a bandwidth parameter of sounding reference signal ($B_{SRS}$). The second configuration can comprise a partial frequency ($P_F$).

In some embodiments, the starting RB index for the second subband may be determined based on the first configuration, the second configuration, the parameter for offset and a parameter shift $N_{shift}$. In some embodiments, the starting RB index for the second subband may be determined based on the size of the first subband (for example, $m_{SRS,B_{SRS}}$), the parameter for partial sounding (for example, $P_F$), the parameter for offset (for example, $k_F$), and a parameter shift $N_{shift}$. For example, $k_F$ may be configured by the terminal device. And $k_F$ is positive integer. For example, $k_F \in \{0,1, \ldots P_F-1\}$. For example, $N_{shift}$ may be determined based on at least one of a slot index/number within a subframe (for example, the slot index may be at least one value of an integer $\in \{0, 1, \ldots 15\}$), a slot index/number within a frame (for example, the slot index/number may be at least one value of an integer $\in \{0, 1, \ldots 159\}$), a symbol index/number within a slot (for example, the symbol index/number may be at least one value of an integer $\in \{0, 1, \ldots 13\}$ or $\{0, 1, \ldots 11\}$), a hopping index, an index for counting of SRS transmission(s), an SRS counter.

In some embodiments, $N_{shift}$ may be indicated via at least one of MAC CE and DCI.

The terminal device 110-1 determines 9010 an index of a start resource block index of a second subband. The index can be determined based on the first configuration, the second configuration and an offset. In some embodiments, the second subband is determined based on the first configuration and the second configuration. For example, the start RB index can be determined based on $K_F$ and a parameter shift $N_{shift}$.

$$N_{offset} = \frac{\left(k_F + \left(\frac{P_F}{2}\right) * N_{shift}\right) \bmod P_F}{P_F} * m_{SRS,B_{SRS}},$$

where $P_F$ represents a partial frequency indicated in the second configuration, n represents an index of a slot or an index of a symbol or an index of a subframe or a hopping index, $N_{offset}$ represents the offset.

In some embodiments, the parameter "$N_{shift}$" can be a cell-specific parameter, for example, the slot/subframe index $$N_{shift} = \mathrm{floor}\left(n_{s,f}^{\mu}/P_F\right) \bmod P_F \text{ or } N_{shift} = \mathrm{floor}\left(n_{s}^{\mu}/P_F\right) \bmod P_F.$$

Alternatively, $N_{shift}$ can be based on the hopping index or the SRS counter or the index for counting of SRS transmission(s) and/or the parameter for partial sounding $P_F$ as shown below:

$$N_{shif} = \left(n_{SRS}/P_F\right)\mathrm{mod}_F \text{ or}$$
$$N_{shift} = \mathrm{floor}\left(n_{SRS}/P_F\right) \text{ or}$$
$$N_{shift} = \mathrm{ceil}\left(n_{SRS}/P_F\right) \text{ or}$$
$$N_{shift} = n_{SRS} \bmod P_F$$

In some embodiments, the offset is determined based on one or more of: a slot index, a symbol index, a subframe index, a hopping index, and a configuration. The configuration can be transmitted in downlink control information (DCI). Alternatively, the configuration can be transmitted in medium access control (MAC) control element (CE). In some embodiments, the offset can be $(\mathrm{floor}(n/P_F)) \bmod P_F$ or $n \bmod P_F$. $P_F$ can represent a partial frequency indicated in the second configuration, n represents an index of a slot or an index of a symbol or an index of a subframe or a hopping index.

The terminal device 110-1 transmits 9015 the SRS based on the maximum number of the cyclic shift, the first and second configurations. In some embodiments, the length of the sounding reference signal sequence is given by:

$$M_{sc,b}^{SRS} = m_{SRS,b} N_{sc}^{RB}/K_{TC}/P_F$$

where $m_{SRS,b}$ is given by a selected row of Table 6.4.1.4.3-1 with $b=B_{SRS}$ where $B_{SRS} \in \{0,1,2,3\}$ is given by the field b-SRS contained in the higher-layer parameter freqHopping if configured, otherwise $B_{SRS=0}$. The row of the table is selected according to the index $C_{SRS} \in \{0,1, \ldots, 63\}$ given by the field c-SRS contained in the higher-layer parameter freqHopping. The frequency-domain starting position $k_0^{(pi)}$ is defined by:

$$k_0^{(p_i)} = \bar{k}_0^{(p_i)} + \sum\nolimits_{b=0}^{B_{SRS}} K_{TC} M_{sc,b}^{SRS} n_b + N_{offset}, \text{ where}$$
$$\bar{k}_0^{(p_i)} = n_{shift} N_{sc}^{RB} + \left(k_{TC}^{(p_i)} + k_{offset}^{l'}\right) \bmod K_{TC}$$

$$k_{TC}^{(p_i)} = \begin{cases} \left(\bar{k}_{TC} + K_{TC}/2\right) \bmod K_{TC} & \text{if } n_{SRS}^{cs} \in \left\{n_{SRS}^{cs,max}/2, \ldots, n_{SRS}^{cs,max} - 1\right\} \text{ and } N_{ap}^{SRS} = 4 \text{ and } p_i \in \{1001, 1003\} \\ \bar{k}_{TC} & \text{otherwise} \end{cases}$$

If $$N_{BWP}^{start} \le n_{shift}$$

the reference point for $$k_0^{(p_i)} = 0$$

is subcarrier 0 in common resource block 0, otherwise the reference point is the lowest subcarrier of the BWP.

If the SRS is configured by the IE SRS-PosResource, the quantity $$k_{offset}^{l'}$$

is given by Table 6.4.1.4.3-2, otherwise $$k_{offset}^{l'} = 0.$$

The frequency domain shift value $n_{shift}$ adjusts the SRS allocation with respect to the reference point grid and is contained in the higher-layer parameter freqDomainShift in the SRS-Resource IE or the SRS-PosResource IE. The transmission comb offset $\bar{k}_{TC} \in \{0,1, \ldots, K_{TC}-1\}$ is contained in the higher-layer parameter transmissionComb in the SRS-Resource IE or the SRS-PosResource IE and $n_b$ is a frequency position index. Frequency hopping of the sounding reference signal is configured by the parameter $b_{hop} \in \{0,1,2,3\}$, given by the field b-hop contained in the higher-layer parameter freqHopping if configured, otherwise $b_{hop}=0$.

If $b_{hop} \geq B_{SRS}$, frequency hopping is disabled and the frequency position index $n_b$ remains constant (unless re-configured) and is defined by, $$n_b = \lfloor 4 n_{RRC} / m'_{SRS,b} \rfloor \bmod N'_b$$

for all $$N_{symb}^{SRS}$$

OFDM symbols of the SRS resource. The quantity $n_{RRC}$ is given by the higher-layer parameter freqDomainPosition if configured, otherwise $n_{RRC}=0$, and the values of $m_{SRS,b}$ and $N_b$ for $b=B_{SRS}$ are given by the selected row of Table 6.4.1.4.3-1 corresponding to the configured value of $C_{SRS}$.

If $b_{hop}<B_{SRS}$, frequency hopping is enabled and the frequency position indices $n_b$ are defined by:

$$n_b = \begin{cases} \lfloor 4 n_{RRC} / m'_{SRS,b} \rfloor \bmod N'_b & b \leq b_{hop} \\ \left(F_b(n_{SRS}) + \lfloor 4 n_{RRC} / m'_{SRS,b} \rfloor\right) \bmod N'_b & \text{otherwise} \end{cases}.$$

If partial frequency sounding is configured, $$N'_b = \begin{cases} N_b * P_F, & \text{if } b = B_{SRS} \\ N_b, & \text{otherwise} \end{cases}, \text{ and}$$

$$m'_{SRS,b} = \begin{cases} m_{SRS,b}/P_F, & \text{if } b = B_{SRS} \\ m_{SRS,b}, & \text{otherwise} \end{cases},$$

otherwise $$N'_b = N_b$$

and $$m'_{SRS,b} = m_{SRS,b},$$

where $N_b$ is given by Table 6.4.1.4.3-1, $$F_b(n_{SRS}) = \begin{cases} (N'_b/2)\left\lfloor \frac{n_{SRS} \bmod \prod_{b'=b_{hop}}^{b} N'_{b'}}{\prod_{b'=b_{hop}}^{b-1} N'_{b'}} \right\rfloor + \left\lfloor \frac{n_{SRS} \bmod \prod_{b'=b_{hop}}^{b} N'_{b'}}{2\prod_{b'=b_{hop}}^{b-1} N'_{b'}} \right\rfloor & \text{if } N'_b \text{ even} \\ (N'_b/2)\left\lfloor \frac{n_{SRS}}{\prod_{b'=b_{hop}}^{b-1} N'_{b'}} \right\rfloor & \text{if } N'_b \text{ odd} \end{cases}$$

and where $N_{b_{hop}}=1$ regardless of the value of $$N'_b.$$

The quantity $n_{SRS}$ counts the number of SRS transmissions. For the case of an SRS resource configured as aperiodic by the higher-layer parameter resourceType, it is given by $n_{SRS}=\lfloor l'/R \rfloor$ within the slot in which the $$N_{symb}^{SRS}$$

symbol SRS resource is transmitted. The quantity $$R \leq N_{symb}^{SRS}$$

is the repetition factor given by the field repetitionFactor if configured, otherwise $$R = N_{symb}^{SRS}.$$

For the case of an SRS resource configured as periodic or semi-persistent by the higher-layer parameter resourceType, the SRS counter is given by $$n_{SRS} = \left(\frac{N_{slot}^{frame,\mu} n_f + n_{s,f}^{\mu} - T_{offset}}{T_{SRS}}\right) \cdot \left(\frac{N_{symb}^{SRS}}{R}\right) + \left\lfloor \frac{l'}{R} \right\rfloor$$

for slots that satisfy $$\left(N_{slot}^{frame,\mu} n_f + n_{s,f}^{\mu} - T_{offset}\right) \bmod T_{SRS} = 0.$$

The periodicity $T_{SRS}$ in slots and slot slot offset $T_{offset}$ are given in clause 6.4.1.4.4.

Alternatively, the length of the sounding reference signal sequence is given by:

$$M_{sc,b}^{SRS} = m_{SRS,b} N_{sc}^{RB} / K_{TC} / P_F.$$

where $m_{SRS,b}$ is given by a selected row of Table 6.4.1.4.3-1 with $b=B_{SRS}$ where $B_{SRS} \in \{0,1,2,3\}$ is given by the field b-SRS contained in the higher-layer parameter freqHopping if configured, otherwise $B_{SRS}=0$. The row of the table is selected according to the index $C_{SRS} \in \{0,1, \ldots, 63\}$ given by the field c-SRS contained in the higher-layer parameter freqHopping.

The frequency-domain starting position $$k_0^{(p_i)}$$

is defined by $$k_0^{(p_i)} = \bar{k}_0^{(p_i)} + \sum_{b=0}^{B_{SRS}+1} K_{TC} M_{sc,b}^{SRS} n_b + N_{offset} \text{ where}$$

$$\bar{k}_0^{(p_i)} = n_{shift} N_{sc}^{RB} + \left(k_{TC}^{(p_i)} + k_{offset}^{l'}\right) \bmod K_{TC}$$

$$k_{TC}^{(p_i)} = \begin{cases} (\bar{k}_{TC} + K_{TC}/2) \bmod K_{TC} & \text{if } n_{SRS}^{cs} \in \{n_{SRS}^{cs,max}/2, \ldots, n_{SRS}^{cs,max} - 1\} \text{ and } N_{ap}^{SRS} = 4 \text{ and } p_i \in \{1001, 1003\} \\ \bar{k}_{TC} & \text{otherwise} \end{cases}$$

If $$N_{BWP}^{start} \leq n_{shift}$$

the reference point for $$k_0^{(p_i)} = 0$$

subcarrier 0 in common resource block 0, otherwise the reference point is the lowest subcarrier of the BWP.

If the SRS is configured by the IE SRS-PosResource, the quantity $$k_{offset}^{l'}$$

is given by Table 6.4.1.4.3-2, otherwise $$k_{offset}^{l'} = 0.$$

The frequency domain shift value $n_{shift}$ adjusts the SRS allocation with respect to the reference point grid and is contained in the higher-layer parameter freqDomainShift in the SRS-Resource IE or the SRS-PosResource IE. The transmission comb offset $\bar{k}_{TC} \in \{0,1, \ldots, K_{TC}-1\}$ is contained in the higher-layer parameter transmissionComb in the SRS-Resource IE or the SRS-PosResource IE and $n_b$ is a frequency position index.

Frequency hopping of the sounding reference signal is configured by the parameter $b_{hop} \in \{0,1,2,3\}$, given by the field b-hop contained in the higher-layer parameter freqHopping if configured, otherwise $b_{hop}=0$.

If $b_{hop} \geq B_{SRS}$, frequency hopping is disabled and the frequency position index $n_b$ remains constant (unless re-configured) and is defined by $$n_b = \lfloor 4n_{RRC}/m'_{SRS,b} \rfloor \bmod N'_b$$

for all $$N_{symb}^{SRS}$$

OFDM symbols of the SRS resource. The quantity $n_{RRC}$ is given by the higher-layer parameter freqDomainPosition if configured, otherwise $n_{RRC}=0$, and the values of $m_{SRS,b}$ and $N_b$ for $b=B_{SRS}$ are given by the selected row of Table 6.4.1.4.3-1 corresponding to the configured value of $C_{SRS}$.

If $b_{hop}<B_{SRS}$, frequency hopping is enabled and the frequency position indices $n_b$ are defined by $$n_b = \begin{cases} \lfloor 4n_{RRC}/m'_{SRS,b} \rfloor \bmod N'_b & b \leq b_{hop} \\ (F_b(n_{SRS}) + \lfloor 4n_{RRC}/m'_{SRS,b} \rfloor) \bmod N'_b & \text{otherwise} \end{cases}$$

If partial frequency sounding is configured, $$N'_b = \begin{cases} P_F, & \text{if } b = B_{SRS}+1 \\ N_b, & \text{otherwise} \end{cases}, \text{ and } m'_{SRS,b} = \begin{cases} m_{SRS,b}/P_F, & \text{if } b = B_{SRS}+1 \\ m_{SRS,b}, & \text{otherwise} \end{cases},$$

otherwise $$N'_b = N_b$$

and $$m'_{SRS,b} = m_{SRS,b},$$

where $N_b$ is given by Table 6.4.1.4.3-1, $$F_b(n_{SRS}) = \begin{cases} (N'_b/2)\left\lfloor \dfrac{n_{SRS} \bmod \prod_{b'=b_{hop}}^{b} N'_{b'}}{\prod_{b'=b_{hop}}^{b-1} N'_{b'}} \right\rfloor + \left\lfloor \dfrac{n_{SRS} \bmod \prod_{b'=b_{hop}}^{b} N'_{b'}}{2\prod_{b'=b_{hop}}^{b-1} N'_{b'}} \right\rfloor & \text{if } N'_b \text{ even} \\ (N'_b/2)\left\lfloor \dfrac{n_{SRS}}{\prod_{b'=b_{hop}}^{b-1} N'_{b'}} \right\rfloor & \text{if } N'_b \text{ odd} \end{cases}$$

and where $N_{b_{hop}}=1$ regardless of the value of $$N'_b$$

The quantity $n_{SRS}$ counts the number of SRS transmissions. For the case of an SRS resource configured as aperiodic by the higher-layer parameter resourceType, it is given by $n_{SRS}$=l'/R within the slot in which the $$N_{symb}^{SRS}$$

symbol SRS resource is transmitted. The quantity $$R \le N_{symb}^{SRS}$$

is the repetition factor given by the field repetitionFactor if configured, otherwise $$R = N_{symb}^{SRS}.$$

For the case of an SRS resource configured as periodic or semi-persistent by the higher-layer parameter resourceType, the SRS counter is given by $$n_{SRS} = \left(\frac{N_{slot}^{frame,\mu} n_f + n_{s,f}^{\mu} - T_{offset}}{T_{SRS}}\right) \cdot \left(\frac{N_{symb}^{SRS}}{R}\right) + \left\lfloor \frac{l'}{R} \right\rfloor$$

for slots that satisfy $$\left(N_{slot}^{frame,\mu} n_f + n_{s,f}^{\mu} - T_{offset}\right) \bmod T_{SRS} = 0.$$

The periodicity $T_{SRS}$ in slots and slot offset $T_{offset}$ are given in clause 6.4.1.4.4.

Figure 10:
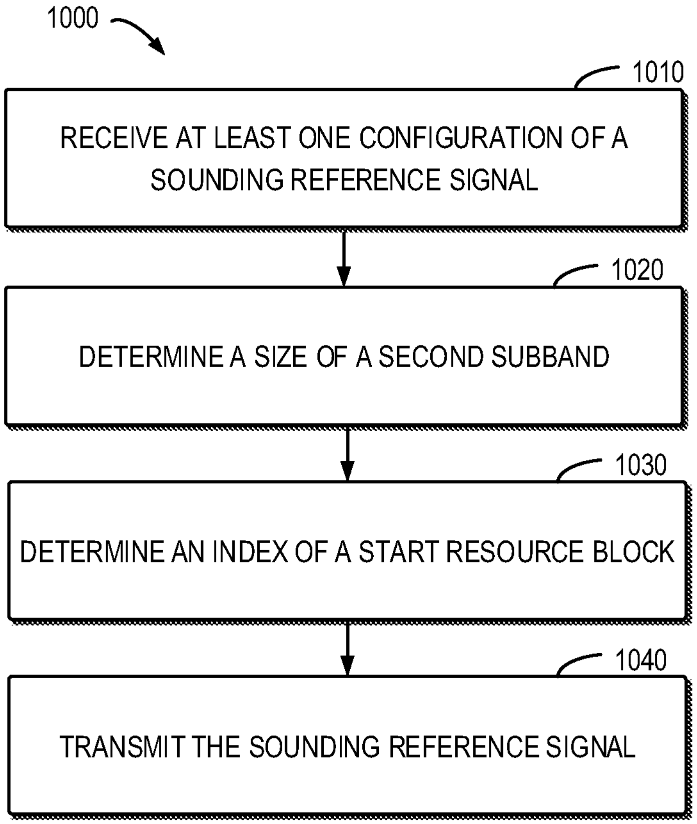
FIG. 10 illustrates a flow chart of an example method of communication implemented at a terminal device in accordance with some embodiments of the present disclosure.

FIG. 10 shows a flowchart of an example method 1000 in accordance with an embodiment of the present disclosure. Only for the purpose of illustrations, the method 1000 can be implemented at a terminal device 110-1 as shown in FIG. 1.

At block 1010, the terminal device 110-1 receives, from the network device 120, at least one configuration of a sounding reference signal, the configuration comprising a first configuration of a first subband and a second configuration of a partial sounding. The first configuration can comprise: a number of physical resource blocks and a bandwidth parameter of sounding reference signal ($B_{SRS}$). The second configuration can comprise a partial frequency ($P_F$).

At block 1020, the terminal device 110-1 determines, based on the first configuration and the second configuration, a size of a second subband. The size of the second subband is multiple of four. At block 1030, the terminal device 110-1 determines an index of a start resource block of the second subband. The index of the start resource block is multiple of four.

If $$\frac{1}{P_F} * m_{SRS,B_{SRS}}$$

is not an integer multiple of four, the size of the second subband is a round number of $$\frac{1}{P_F} * m_{SRS,B_{SRS}}$$

which is an integer multiple of four, where $P_F$ represents a partial frequency indicated in the second configuration, mSRS represents a number of physical resource blocks indicated in the first configuration and $B_{SRS}$represents a bandwidth parameter of sounding reference signal indicated in the first configuration.

In some embodiments, the terminal device 110-1 can determine a first size of a first portion of the second subband to be an upper round of multiple of four. Alternatively, the terminal device 110-1 can determine a second size of a second portion of the second subband to be a lower round of multiple of four. In this situation, the first size can be ceil $$\left(\frac{1}{P_F} * m_{SRS,B_{SRS}}/4\right) * 4,$$

and the second size can be floor $$\left(\frac{1}{P_F} * m_{SRS,B_{SRS}}/4\right) * 4.$$

In this case, if the $P_F$ is 2, a first partial subband of the second subband can be ceil $$\left(\frac{1}{P_F} * m_{SRS,B_{SRS}}/4\right) * 4,$$

and the second partial subband of the second subband can be $$m_{SRS,B_{SRS}} - \text{ceil}\left(\frac{1}{P_F} * m_{SRS,B_{SRS}}/4\right) * 4 * (P_F - 1) \text{ or}$$

$$\text{floor}\left(\frac{1}{P_F} * m_{SRS,B_{SRS}}/4\right) * 4.$$

such cases, the index can be $$N_{offset} = k_F * \text{ceil/round}\left(\frac{1}{P_F} * m_{SRS,B_{SRS}}/4\right) * 4,$$

where $k_F$ is from {0, 1, , . . . $P_F$–1}, and $N_{offset}$ represents the index of the start resource block, and ceil/round represents an upper round value.

In some embodiments, if the $P_F$ is four and $$\left| m_{SRS,B_{SRS}} - \text{round}\left(\frac{1}{P_F} * m_{SRS,B_{SRS}}/4\right) * 4/4 \right|$$

equals to 1, one partial subband of the second subband can be $$m_{SRS,B_{SRS}} - \text{round}\left(\frac{1}{P_F} * m_{SRS,B_{SRS}}/4\right) * 4 * 3,$$

and other three partial subbands of the second subband can be round $$\left(\frac{1}{P_F} * m_{SRS,B_{SRS}}/4\right) * 4.$$

Alternatively or in addition, if the $P_F$ is 4 and $$\left|\left(m_{SRS,B_{SRS}} - \text{round}\left(\frac{1}{P_F} * m_{SRS,B_{SRS}}/4\right) * 4\right)/4\right|$$

equals to 2, two partial subbands of the second subband can be $$\left(m_{SRS,B_{SRS}} - \text{round}\left(\frac{1}{P_F} * m_{SRS,B_{SRS}}/4\right) * 4 * 2\right)/2,$$

and other two partial subbands of the second subband can be round $$\left(\frac{1}{P_F} * m_{SRS,B_{SRS}}/4\right) * 4.$$

In such cases, the index of the start resource block can be $$N_{offset} = \sum_{i=0}^{k_F} S_i,$$

where $k_F$ is from {0, 1, , . . . $P_F$−1}, Si represents the i-th partial band in the second subbands, and $N_{offset}$ represents the index of the start resource block, and ceil/round represents an upper round value.

In other embodiments, each partial subband in the second subband is ceil $$\left(\frac{1}{P_F} * m_{SRS,B_{SRS}}/4\right) * 4.$$

The first index of a first start resource block for a first partial suband of the second subband can be 0, and the second index of a second start resource block for a second partial subband of the second subband can be ceil $$\left(\frac{1}{P_F} * m_{SRS,B_{SRS}}/4\right) * 4 - 4.$$

Alternatively, each partial subband in the second subband can be floor $$\left(\frac{1}{P_F} * m_{SRS,B_{SRS}}/4\right) * 4.$$

In this situation, the first index of a first start resource block for a first partial suband of the second subband can be 0, and the second index of a second start resource block for a second partial subband of the second subband can be floor $$\left(\frac{1}{P_F} * m_{SRS,B_{SRS}}/4\right) * 4 + 4.$$

In other embodiments, each partial subband in the second subband can be round $$\left(\frac{1}{P_F} * m_{SRS,B_{SRS}}/4\right) * 4.$$

In this case, the index of the start resource block can be $$N_{offset} = \begin{cases} k_F * X + \left\lfloor (k_F + 1)/\left(\frac{P_F}{2}\right)\right\rfloor * \left(m_{SRS,B_{SRS}} - X\right)/2, & \text{if } \left|\left(m_{SRS,B_{SRS}} - X\right)/4\right| = 2 \\ k_F * X + \left\lfloor k_F/(P_F/2)\right\rfloor * \left(m_{SRS,B_{SRS}} - X\right), & \text{otherwise} \end{cases},$$

where $k_F$ is from {0, 1, , . . . $P_F$−1}, $N_{offset}$ represents the index of the start resource block, and X represents round $$\left(\frac{1}{P_F} * m_{SRS,B_{SRS}}/4\right) * 4.$$

At block 1030, the terminal device 110-1 transmits, to the network device 120, the sounding reference signal based on the size of the second subband and the index.

Figure 11:
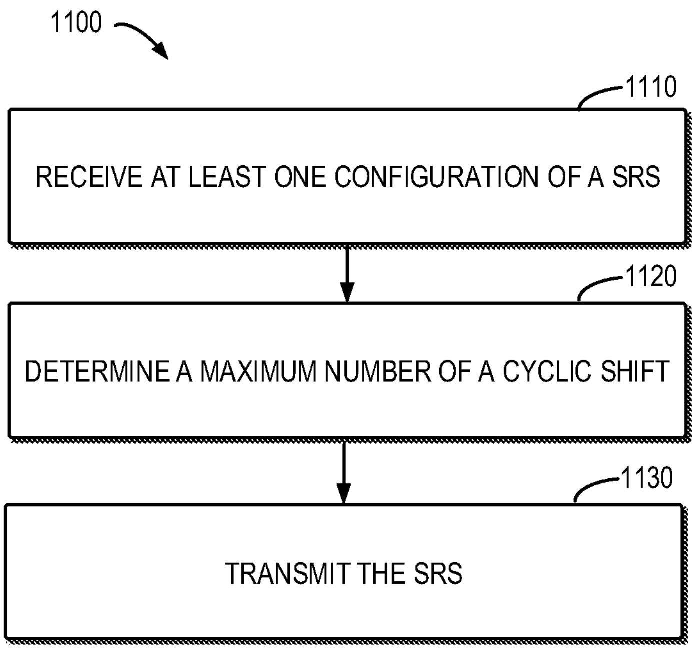
FIG. 11 illustrates a flow chart of an example method of communication implemented at a terminal device in accordance with some embodiments of the present disclosure.

FIG. 11 shows a flowchart of an example method 1100 in accordance with an embodiment of the present disclosure. Only for the purpose of illustrations, the method 1100 can be implemented at a terminal device 110-1 as shown in FIG. 1.

At block 1110, the terminal device 110-1 receives, from the network device 120, at least one configuration of a sounding reference signal. The at least one configuration comprises a first configuration of a first subband and a second configuration of a partial sounding.

At block 1120, the terminal device 110-1 determines a maximum number of a cyclic shift based on a comb parameter, and the second configuration. In some embodiments, the terminal device may receive a configuration for the comb parameter (for example, represented as $K_{TC}$. $K_{TC}$ is positive integer. For example, $K_{TC}$ may be at least one of {1, 2, 4, 8} or {2, 4, 8}) from the network device. For example, via at least one of RRC, MAC CE and DCI. In some embodiments, the second configuration may be the parameter for partial sounding $P_F$ as described in the disclosure. In some embodiments, the maximum number of the cyclic shift can be determined based on a product of a value of the comb parameter and a value of the second configuration. For example, the maximum number of the cyclic shift is at least one of: 8, when the value of comb parameter is 2 and the value of second configuration is 1; 12, when the value of comb parameter is 2 and the value of second configuration is 2; 6, when the value of comb parameter is 2 and the value of second configuration is 4 or when the value of comb parameter is 4 and the value of second configuration is 2; and 3, when the value of comb parameter is 4 and the value of second configuration is 4 or when the value of comb parameter is 2 and the value of second configuration is 8 or when the value of comb parameter is 8 and the value of second configuration is 2.

In some embodiments, the maximum number of the cyclic shift may be determined based on a product of the value of the comb parameter $K_{TC}$ and the value of the parameter of partial sounding $P_F$. For example, the product may be $K_{TC}$*$P_F$. In some embodiments, if $K_{TC}$*$P_F$=2, the maximum number of cyclic shift may be 8 or 12. For example, $K_{TC}$=2 and $P_F$=1 or the parameter of partial sounding is not configured or partial sounding is not enabled/configured. In some embodiments, if $K_{TC}$*$P_F$=4, the maximum number of cyclic shift may be 12. For example, $K_{TC}$=2 and $P_F$=2. As another example, $K_{TC}$=4 and $P_F$=1 or the parameter of partial sounding is not configured or partial sounding is not enabled/configured. In some embodiments, if $K_{TC}$*$P_F$=8, the maximum number of cyclic shift may be 6. For example, $K_{TC}$=4 and $P_F$=2. As another example, $K_{TC}$=2 and $P_F$=4. As another example, $K_{TC}$=8 and $P_F$=1 or the parameter of partial sounding is not configured or partial sounding is not enabled/configured. In some embodiments, if $K_{TC}$*$P_F$=16, the maximum number of cyclic shift may be 12 or 8 or 6 or 3. For example, $K_{TC}$=4 and $P_F$=4. As another example, $K_{TC}$=2 and $P_F$=8. As another example, $K_{TC}$=8 and $P_F$=2.

In some embodiments, the terminal device does not expect to be configured with the product of $K_{TC}$*$P_F$ is equal to or larger than 16. For example, the terminal device does not expect to be configured with $K_{TC}$=4 and $P_F$=4. As another example, the terminal device does not expect to be configured with $K_{TC}$=2 and $P_F$=8. As another example, the terminal device does not expect to be configured with $K_{TC}$=8 and $P_F$=2. As another example, the terminal device does not expect to be configured with and $K_{TC}$=8 and $P_F$=4 simultaneously. As another example, if the terminal device is configured with $K_{TC}$=8, the terminal device does not expect to be configured with $P_F$>1 or configured with partial sounding or with partial sounding enabled. As another example, if the terminal device is configured with $P_F$>1 or configured with partial sounding or with partial sounding enabled, the terminal device does not expect to be configured with $K_{TC}$=8. As another example, the terminal device does not expect to be configured with and $K_{TC}$=4 and $P_F$=4 simultaneously. As another example, if the terminal device is configured with $P_F$=4, the terminal device only expects to be configured with $K_{TC}$=2.

In some embodiments, the maximum number of the cyclic shift can be determined based on the comb parameter and a size of a second subband $$\left(\text{for example, } \frac{1}{P_F} * m_{SRS,B_{SRS}}\right),$$

and the size is determined based on the first and the second configuration.

In some embodiments, if the value of $$\frac{1}{P_F} * m_{SRS,B_{SRS}}$$

is an odd integer, the maximum number of cyclic shift may be 6. For example, the terminal device only expects to be configured with $K_{TC}$=2. In some embodiments, if the value of $$\frac{1}{P_F} * m_{SRS,B_{SRS}}$$

is an odd integer, and if the value of $K_{TC}$ is configured to be 2, the maximum number of cyclic shift may be 6, and if the value of $K_{TC}$ is configured to be 4, the maximum number of cyclic shift may be 3. For example, the terminal device only expects to be configured with $K_{TC}$=2 or 4.

In some embodiments, if the value of $$\frac{1}{P_F} * m_{SRS,B_{SRS}}$$

is an even integer but not a multiple of four (for example, $$\left(\left(\frac{1}{P_F} * m_{SRS,B_{SRS}}\right) \bmod 2 = 0 \text{ and } \left(\frac{1}{P_F} * m_{SRS,B_{SRS}}\right) \bmod 4 \neq 0\right),$$

the maximum number of cyclic shift may be 12 or 6. For example, the terminal device only expects to be configured with $K_{TC}$=2 or 4. In some embodiments, if the value of $$\frac{1}{P_F} * m_{SRS,B_{SRS}}$$

is an even integer but not a multiple of four (for example, $$\left(\left(\frac{1}{P_F} * m_{SRS,B_{SRS}}\right) \bmod 2 = 0 \text{ and } \left(\frac{1}{P_F} * m_{SRS,B_{SRS}}\right) \bmod 4 \neq 0\right),$$

and if the value of $K_{TC}$ is configured to be 2, the maximum number of cyclic shift may be 12, and if the value of $K_{TC}$ is configured to be 4, the maximum number of cyclic shift may be 6.

In some embodiments, if the value of $$\frac{1}{P_F} * m_{SRS,B_{SRS}}$$

is an even integer but not a multiple of four (for example, $$\left(\frac{1}{P_F} * m_{SRS,B_{SRS}}\right) \bmod 2 = 0 \text{ and } \left(\frac{1}{P_F} * m_{SRS,B_{SRS}}\right) \bmod 4 \neq 0\Bigg),$$

the maximum number of cyclic shift may be 12 or 6 or 3. In some embodiments, if the value of $$\frac{1}{P_F} * m_{SRS,B_{SRS}}$$

is an even integer but not a multiple of four (for example, $$\left(\frac{1}{P_F} * m_{SRS,B_{SRS}}\right) \bmod 2 = 0 \text{ and } \left(\frac{1}{P_F} * m_{SRS,B_{SRS}}\right) \bmod 4 \neq 0\Bigg),$$

and if the value of $K_{TC}$ is configured to be 2, the maximum number of cyclic shift may be 12, and if the value of $K_{TC}$ is configured to be 4, the maximum number of cyclic shift may be 6, and if the value of $K_{TC}$ is configured to be 8, the maximum number of cyclic shift may be 3. For example, the terminal device only expects to be configured with $K_{TC}$=2 or 4 or 8.

In some embodiments, if the value of $$\frac{1}{P_F} * m_{SRS,B_{SRS}}$$

is a multiple of four (for example, $$\left(\frac{1}{P_F} * m_{SRS,B_{SRS}}\right) \bmod 4 \neq 0\Bigg),$$

the maximum number of cyclic shift may be 8 or 12 or 6. In some embodiments, if the value of $$\frac{1}{P_F} * m_{SRS,B_{SRS}}$$

is a multiple of four (for example, $$\left(\frac{1}{P_F} * m_{SRS,B_{SRS}}\right) \bmod 4 \neq 0\Bigg),$$

and if the value of $K_{TC}$ is configured to be 2, the maximum number of cyclic shift may be 8, and if the value of $K_{TC}$ is configured to be 4, the maximum number of cyclic shift may be 12, and if the value of $K_{TC}$ is configured to be 8, the maximum number of cyclic shift may be 6. For example, the terminal device only expects to be configured with $K_{TC}$=2 or 4 or 8.

In some embodiments, the maximum number of the cyclic shift may be determined based on a length of the sequence for SRS, and the length is determined based on the first and the second configuration and the comb parameter $K_{TC}$. For example, the length may be represented as $$\frac{1}{P_F} * m_{SRS,B_{SRS}} * N_{SC}^{RB}/K_{TC}.$$

For example, $N_{SC}^{RB}$ is the number of subcarriers per resource block. $N_{SC}^{RB}$ is a positive integer. For example $N_{SC}^{RB}$=12.

In some embodiments, if the value of $$\frac{1}{P_F} * m_{SRS,B_{SRS}} * N_{SC}^{RB}/K_{TC}$$

is an odd integer multiple of 6 (For example, $$\left(\frac{1}{P_F} * m_{SRS,B_{SRS}} * N_{SC}^{RB}/K_{TC}\right)/6$$

is an odd integer. As another example, $$\left(\left(\frac{1}{P_F} * m_{SRS,B_{SRS}} * N_{SC}^{RB}/K_{TC}\right)/6\right) \bmod 2 = 1\Bigg),$$

the maximum number of cyclic shift may be 6.

In some embodiments, if the value of $$\frac{1}{P_F} * m_{SRS,B_{SRS}} * N_{SC}^{RB}/K_{TC}$$

is an even integer of multiple of 6, but not a multiple of four of multiple of 6, (For example, $$\left(\frac{1}{P_F} * m_{SRS,B_{SRS}} * N_{SC}^{RB}/K_{TC}\right)/6$$

is even integer but not a multiple of four. As another example, $$\left(\left(\frac{1}{P_F} * m_{SRS,B_{SRS}} * N_{sc}^{RB}/K_{TC}\right)/6\right) \bmod 2 = 0 \text{ and}$$
$$\left(\left(\frac{1}{P_F} * m_{SRS,B_{SRS}} * N_{sc}^{RB}/K_{TC}\right)/6\right) \bmod 4 \neq 0\Bigg),$$

the maximum number of cyclic shift may be 12. In some embodiments, if the value of $$\frac{1}{P_F} * m_{SRS,B_{SRS}} * N_{sc}^{RB}/K_{TC}$$

is a multiple of four of multiple of 6, (For example, $$\left(\frac{1}{P_F} * m_{SRS,B_{SRS}} * N_{sc}^{RB}/K_{TC}\right)/6$$

is a multiple of four. As another example, $$\left(\left(\frac{1}{P_F} * m_{SRS,B_{SRS}} * N_{sc}^{RB}/K_{TC}\right)/6\right)\mathrm{mod}4 = 0),$$

the maximum number of cyclic shift may be 8 or 12 or 24. In some embodiments, the terminal device may be configured with a number of antenna ports $$(\text{For example, } N_{ap}^{SRS})$$

for SRS. For example, the number of ports may be 1 or 2 or 4.

In some embodiments, the cyclic shift $\alpha_i$ for antenna port $p_i$ may be $\alpha_i=$ $$2\pi\frac{n_{SRS}^{cs,i}}{n_{SRS}^{cs,max}}, \text{ and } n_{SRS}^{cs,i} = \left(n_{SRS}^{cs} + \frac{n_{SRS}^{cs,max}(p_i - 1000)}{N_{ap}^{SRS}}\right)\mathrm{mod}\, n_{SRS}^{cs,max}.$$

For example, $$n_{SRS}^{cs}$$

may be configured by the network device. For example, configured in higher layer parameter transmission Comb. For example, the value of $$n_{SRS}^{cs}$$

is non-negative integer, and $$n_{SRS}^{cs} \in \{0, 1, \ldots n_{SRS}^{cs,max} - 1\}.$$

For example, $$n_{ap}^{SRS}$$

is the number of antenna ports for SRS. For example, $$N_{ap}^{SRS}$$

may be any one of {1, 2, 4, 6, 8}.

$$n_{SRS}^{cs,max}$$

is the maximum number of cyclic shift. For example, $$n_{SRS}^{cs,max}$$

may be at least one of {8, 12, 6, 3}. For example, $$n_{SRS}^{cs,max}$$

may be determined based on embodiments in this disclosure. For example, $p_i$ may be the antenna port index. For example, $$i \in \{0, 1, \ldots N_{ap}^{SRS} - 1\}.$$

For example, the port index for antenna port $p_i$ may be 1000+i. For example, if the number of antenna ports is configured as 1 (for example, $i \in \{0\}$), the value of $p_0$ may be 1000. As another example, if the number of antenna ports is configured as 2 (for example, $i \in \{0,1\}$), the value of $p_0$ may be 1000, and the value of $p_1$ may be 1001. As another example, if the number of antenna ports is configured as 4 (for example, $i \in \{0,1,2,3\}$), the value of $p_0$, $p_1$, $p_2$ and $p_3$ may be 1000, 1001, 1002 and 1003, respectively. As another example, if the number of antenna ports is configured as 6 (for example, $i \in \{0,1,2,3,4,5\}$), the value of $p_0$, $p_1$, $p_2$, $p_3$, $p_4$ and $p_5$ may be 1000, 1001, 1002, 1003, 1004 and 1005, respectively. As another example, if the number of antenna ports is configured as 8 (for example, $i \in \{0,1,2,3,4,5,6,7\}$), the value of $p_0$, $p_1$, $p_2$, $p_3$, $p_4$, $p_5$, $p_6$ and $p_7$ may be 1000, 1001, 1002, 1003, 1004, 1005, 1006 and 1007, respectively.

In some embodiments, when the terminal device is configured with the number of antenna ports for SRS equal to or larger than 4, for example, 4 or 6 or 8 antenna ports. In some embodiments, if the maximum number of cyclic shift $$n_{SRS}^{cs,max} = 6,$$

the cyclic shift $\alpha_i$ for antenna port $p_i$ may be $$\alpha_i = 2\pi\frac{n_{SRS}^{cs,i}}{n_{SRS}^{cs,max}}, \text{ and } n_{SRS}^{cs,i} = (n_{SRS}^{cs} + H)\mathrm{mod}\, n_{SRS}^{cs,max}.$$

In some embodiments, H=i for antenna port $p_i$. In some embodiments, $$H = \mathrm{floor}\left(\frac{n_{SRS}^{cs,max}(p_i - 100)}{N_{ap}^{SRS}}\right).$$

In some embodiments, For example, $$H = \mathrm{ceil}\left(\frac{n_{SRS}^{cs,max}(p_i - 100)}{N_{ap}^{SRS}}\right).$$

For example, $$n_{SRS}^{cs}$$

may be configured by the network device. For example, configured in higher layer parameter transmissionComb. For example, the value of $$n_{SRS}^{cs}$$

is non-negative integer, and $$n_{SRS}^{cs} \in \{0, 1, \ldots n_{SRS}^{cs,max} - 1\}.$$

For example, $$N_{ap}^{SRS}$$

is the number of antenna ports for SRS. For example, $$N_{ap}^{SRS}$$

may be any one of {1, 2, 4, 6, 8}.

$$n_{SRS}^{cs,max}$$

is the maximum number of cyclic shift. For example, $$n_{SRS}^{cs,max}$$

may be at least one of {8, 12, 6, 3}. For example, $$n_{SRS}^{cs,max}$$

may be determined based on embodiments in this disclosure. For example, $p_i$ may be the antenna port index. For example, $$i \in \{0, 1, \ldots N_{ap}^{SRS} - 1\}.$$

For example, the port index for antenna port $p_i$ may be 1000+i. For example, if the number of antenna ports is configured as 1 (for example, i∈{0}), the value of $p_0$ may be 1000. As another example, if the number of antenna ports is configured as 2 (for example, i∈{0,1}), the value of $p_0$ may be 1000, and the value of $p_1$ may be 1001. As another example, if the number of antenna ports is configured as 4 (for example, i∈{0,1,2,3}), the value of $p_0$, $p_1$, $p_2$ and $p_3$ may be 1000, 1001, 1002 and 1003, respectively. As another example, if the number of antenna ports is configured as 6 (for example, i∈{0,1,2,3,4,5}), the value of $p_0$, $p_1$, $p_2$, $p_3$, $p_4$ and $p_5$ may be 1000, 1001, 1002, 1003, 1004 and 1005, respectively. As another example, if the number of antenna ports is configured as 8 (for example, i∈{0,1,2,3,4,5,6,7}), the value of $p_0$, $p_1$, $p_2$, $p_3$, $p_4$, $p_5$, $p_6$ and p7 may be 1000, 1001, 1002, 1003, 1004, 1005, 1006 and 1007, respectively.

At block 1130, the terminal device 110-1 transmits, to the network device 120, the sounding reference signal based on the maximum number of the cyclic shift, the first and second configurations.

Figure 12:
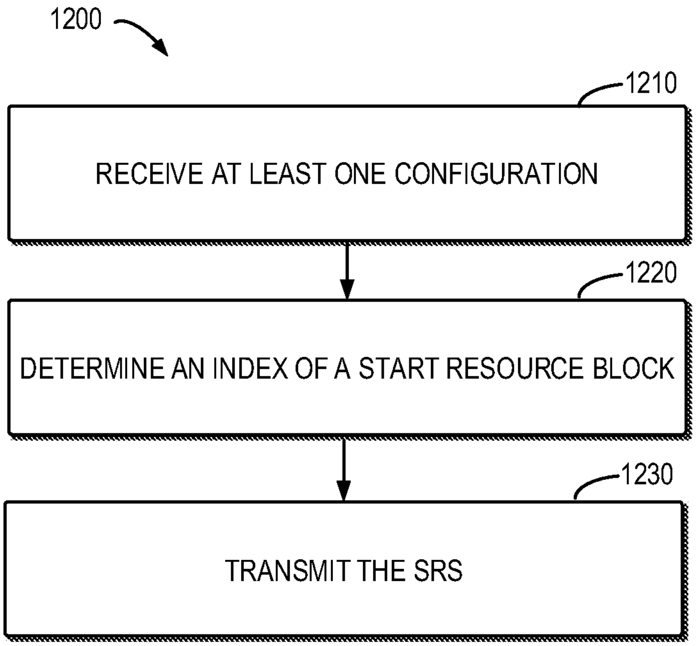
FIG. 12 illustrates a flow chart of an example method of communication implemented at a terminal device in accordance with some embodiments of the present disclosure.

FIG. 12 shows a flowchart of an example method 1200 in accordance with an embodiment of the present disclosure. Only for the purpose of illustrations, the method 1200 can be implemented at a terminal device 110-1 as shown in FIG. 1.

At block 1210, the terminal device 110-1 receives, from the network device 120, at least one configuration of a sounding reference signal. The configuration comprises a first configuration of a first subband and a second configuration of a partial sounding.

At block 1220, the terminal device 110-1 determines an index of a start resource block of a second subband, wherein the index is based on the first configuration, the second configuration and an offset. In some embodiments, the second subband can be determined based on the first configuration and the second configuration. The offset is determined based on at least one of: a slot index, a symbol index, a subframe index, a hopping index, and a configuration in downlink control information or medium access control (MAC) control element (CE).

Alternatively or in addition, the offset can be (floor(n/$P_F$)) mod $P_F$ or n mod $P_F$, where $P_F$ represents a partial frequency indicated in the second configuration, n represents an index of a slot or an index of a symbol or an index of a subframe or a hopping index.

At block 1230, the terminal device 110-1 transmits, to the network device 120, the sounding reference signal based on the index.

Figure 13:
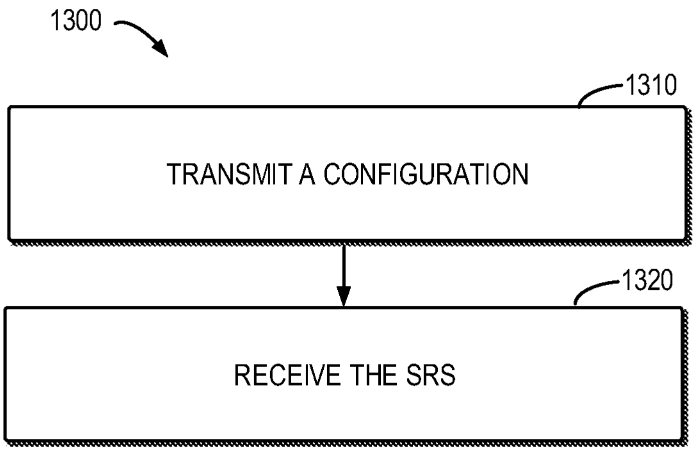
FIG. 13 illustrates a flow chart of an example method of communication implemented at a network device in accordance with some embodiments of the present disclosure.

FIG. 13 shows a flowchart of an example method 1300 in accordance with an embodiment of the present disclosure. Only for the purpose of illustrations, the method 1300 can be implemented at a network device 120 as shown in FIG. 1.

At block 1310, the network device 120 transmits, to the terminal device 110-1, a configuration of a sounding reference signal. The configuration comprises a first configuration of a first subband and a second configuration of a partial sounding. In some embodiments, the first configuration comprises: a number of physical resource blocks and a bandwidth parameter of sounding reference signal ($B_{SRS}$) and the second configuration can comprise a partial frequency ($P_F$).

At block 1320, the network device 120 receives, from the terminal device 110-1, the sounding reference signal based on a size of a second subband and an index of a start resource block, the size of the second subband being multiple of four and the index of the start resource block being multiple of four.

Figure 14:
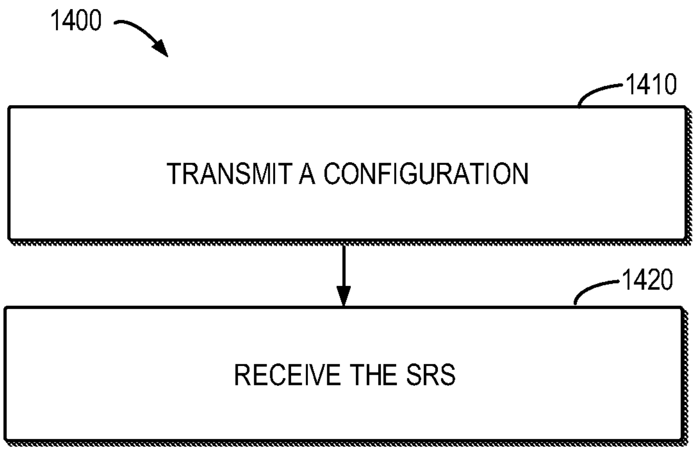
FIG. 14 illustrates a flow chart of an example method of communication implemented at a network device in accordance with some embodiments of the present disclosure.

FIG. 14 shows a flowchart of an example method 1400 in accordance with an embodiment of the present disclosure. Only for the purpose of illustrations, the method 1400 can be implemented at a network device 120 as shown in FIG. 1.

At block 1410, the network device 120 transmits, to the terminal device 110-1, at least one configuration of a sounding reference signal. The at least one configuration comprises a first configuration of a first subband and a second configuration of a partial sounding. In some embodiments, the maximum number of the cyclic shift can be determined based on a product of a value of the comb parameter and a value of the second configuration. In this case, the maximum number of the cyclic shift is at least one of: 8, when the value of comb parameter is 2 and the value of second configuration is 1; 12, when the value of comb parameter is 2 and the value of second configuration is 2; 6, when the value of comb parameter is 2 and the value of second configuration is 4 or when the value of comb parameter is 4 and the value of second configuration is 2; and 3, when the value of comb parameter is 4 and the value of second configuration is 4 or when the value of comb parameter is 2 and the value of second configuration is 8 or when the value of comb parameter is 8 and the value of second configuration is 2.

Alternatively or in addition, the maximum number of the cyclic shift can be determined based on the comb parameter and a size of a second subband, and the size is determined based on the first and the second configuration.

At block 1420, the network device 120 receives, from the terminal device 110-1, the sounding reference signal based on the maximum number of the cyclic shift, the first and second configurations.

Figure 15:
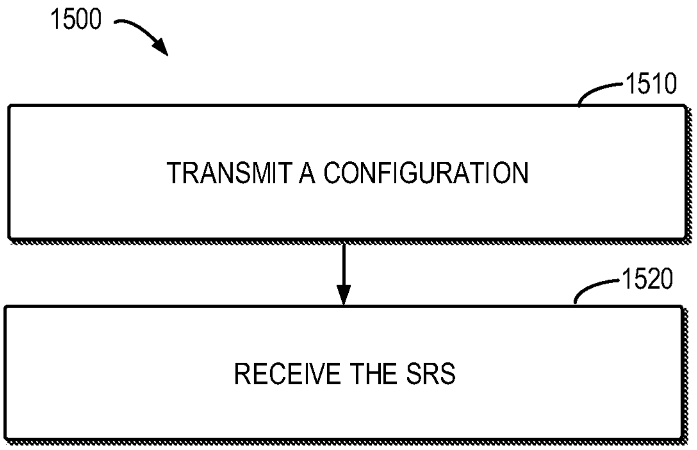
FIG. 15 illustrates a flow chart of an example method of communication implemented at a network device in accordance with some embodiments of the present disclosure.

FIG. 15 shows a flowchart of an example method 1500 in accordance with an embodiment of the present disclosure. Only for the purpose of illustrations, the method 1500 can be implemented at a network device 120 as shown in FIG. 1.

At block 1510, the network device 120 transmits, to the terminal device 110-1, at least one configuration of a sounding reference signal. The configuration comprises a first configuration of a first subband and a second configuration of a partial sounding. In some embodiments, the second subband can be determined based on the first configuration and the second configuration. In this case, the offset can be determined based on at least one of: a slot index, a symbol index, a subframe index, a hopping index, and a configuration in DCI or MAC CE.

In some embodiments, the offset is (floor(n/$P_F$)) mod $P_F$ or n mod $P_F$, where $P_F$ represents a partial frequency indicated in the second configuration, n represents an index of a slot or an index of a symbol or an index of a subframe or a hopping index.

At block 1520, the network device 120 receives, from the terminal device 110-1, the sounding reference signal based on an index of a start resource block of a second subband. The index is based on the first configuration, the second configuration and an offset.

In some embodiments, a terminal device comprises circuitry configured to receive, from a network device, at least one configuration of a sounding reference signal, the configuration comprising a first configuration of a first subband and a second configuration of a partial sounding; determine, based on the first configuration and the second configuration, a size of a second subband, the size of the second subband being multiple of four; determine an index of a start resource block of the second subband, the index of the start resource block being multiple of four; and transmit, to the network device, the sounding reference signal based on the size of the second subband and the index.

In some embodiments, the first configuration comprises: a number of physical resource blocks and a bandwidth parameter of sounding reference signal ($B_{SRS}$); and the second configuration comprises a partial frequency ($P_F$).

In some embodiments, in accordance with a determination that $$\frac{1}{P_F} * m_{SRS,B_{SRS}}$$

is not an integer multiple of four, the size of the second subband is a round number of $$\frac{1}{P_F} * m_{SRS,B_{SRS}}$$

which is an integer multiple of four, wherein $P_F$ represents a partial frequency indicated in the second configuration, mSRS represents a number of physical resource blocks indicated in the first configuration and $B_{SRS}$ represents a bandwidth parameter of sounding reference signal indicated in the first configuration.

In some embodiments, the terminal device comprises the circuitry configured to determine the size of the second subband by at least one of: determining a first size of a first portion of the second subband to be an upper round of multiple of four; or determining a second size of a second portion of the second subband to be a lower round of multiple of four.

In some embodiments, the first size is $$\mathrm{ceil}\left(\frac{1}{P_F} * m_{SRS,B_{SRS}}/4\right) * 4.$$

and the second size is $$\mathrm{floor}\left(\frac{1}{P_F} * m_{SRS,B_{SRS}}/4\right) * 4.$$

In some embodiments, in accordance with a determination that the $P_F$ is 2, a first partial subband of the second subband is $$\mathrm{ceil}\left(\frac{1}{P_F} * m_{SRS,B_{SRS}}/4\right) * 4,$$

a second partial subband of the second subband is $$m_{SRS,B_{SRS}} - \mathrm{ceil}\left(\frac{1}{P_F} * m_{SRS,B_{SRS}}/4\right) * 4 * (P_F - 1) \text{ or } \mathrm{floor}\left(\frac{1}{P_F} * m_{SRS,B_{SRS}}/4\right) * 4.$$

In some embodiments, the index of the start resource block is:

$$N_{offset} = k_F * \mathrm{ceil/round}\left(\frac{1}{P_F} * m_{SRS,B_{SRS}}/4\right) * 4,$$

wherein $k_F$ is from {0, 1, , . . . $P_F$−1}, and $N_{offset}$ represents the index of the start resource block, and ceil/round represents an upper round value.

In some embodiments, in in accordance with a determination that the $P_F$ is four and $$\left|\left(m_{SRS,B_{SRS}} - \mathrm{round}\left(\frac{1}{P_F} * m_{SRS,B_{SRS}}/4\right) * 4\right)/4\right|$$

equals to 1, one partial subband of the second subband is $$m_{SRS,B_{SRS}} - \text{round}\left(\frac{1}{P_F} * m_{SRS,B_{SRS}}/4\right) * 4 * 3,$$

and other three partial subbands of the second subband is $$\text{round}\left(\frac{1}{P_F} * m_{SRS,B_{SRS}}/4\right) * 4.$$

In some embodiments, in accordance with a determination that the $P_F$ is 4 and $$\left| m_{SRS,B_{SRS}} - \text{round}\left(\frac{1}{P_F} * m_{SRS,B_{SRS}}/4\right) * 4/4 \right|$$

equals to 2, two partial subbands of the second subband is $$\left( m_{SRS,B_{SRS}} - \text{round}\left(\frac{1}{P_F} * m_{SRS,B_{SRS}}/4\right) * 4 * 2 \right)/2,$$

and other two partial subbands of the second subband is $$\text{round}\left(\frac{1}{P_F} * m_{SRS,B_{SRS}}/4\right) * 4.$$

In some embodiments, the index of the start resource block is:

$$N_{offset} = \sum_{i=0}^{k_F} S_i,$$

wherein $k_F$ is from {0, 1, , . . . $P_F$−1}, Si represents the i-th partial band in the second subbands, and $N_{offset}$ represents the index of the start resource block, and ceil/round represents an upper round value.

In some embodiments, each partial subband in the second subband is $$\text{ceil}\left(\frac{1}{P_F} * m_{SRS,B_{SRS}}/4\right) * 4.$$

In some embodiments, a first index of a first start resource block for a first partial suband of the second subband is 0, and a second index of a second start resource block for a second partial subband of the second subband is $$\text{ceil}\left(\frac{1}{P_F} * m_{SRS,B_{SRS}}/4\right) * 4 - 4.$$

In some embodiments, each partial subband in the second is $$\text{floor}\left(\frac{1}{P_F} * m_{SRS,B_{SRS}}/4\right) * 4.$$

In some embodiments, a first index of a first start resource block for a first partial suband of the second subband is 0, and a second index of a second start resource block for a second partial subband of the second subband is $$\text{floor}\left(\frac{1}{P_F} * m_{SRS,B_{SRS}}/4\right) * 4 + 4.$$

In some embodiments, each partial subband in the second subband is $$\text{round}\left(\frac{1}{P_F} * m_{SRS,B_{SRS}}/4\right) * 4.$$

In some embodiments, the index of the start resource block is $$N_{offset} = \begin{cases} k_F * X + \left\lfloor (k_F + 1)/\left(\frac{P_F}{2}\right) \right\rfloor * \left(m_{SRS,B_{SRS}} - X\right)/2, \\ \quad \text{if } \left|\left(m_{SRS,B_{SRS}} - X\right)/4\right| = 2 \\ k_F * X + \left\lfloor k_F/(P_F/2) \right\rfloor * \left(m_{SRS,B_{SRS}} - X\right), \text{ otherwise} \end{cases},$$

wherein $k_F$ is from {0, 1, , . . . $P_F$−1}, $N_{offset}$ represents the index of the start resource block, and X represents $$\text{round}\left(\frac{1}{P_F} * m_{SRS,B_{SRS}}/4\right) * 4.$$

In some embodiments, a terminal device comprises circuitry configured to receive, at a terminal device and from a network device, at least one configuration of a sounding reference signal, the at least one configuration comprising a first configuration of a first subband and a second configuration of a partial sounding; determine a maximum number of a cyclic shift based on a comb parameter, and the second configuration; and transmit, to the network device, the sounding reference signal based on the maximum number of the cyclic shift, the first and second configurations.

In some embodiments, the maximum number of the cyclic shift is determined based on a product of a value of the comb parameter and a value of the second configuration.

In some embodiments, the maximum number of the cyclic shift is at least one of: 8, when the value of comb parameter is 2 and the value of second configuration is 1; 12, when the value of comb parameter is 2 and the value of second configuration is 2; 6, when the value of comb parameter is 2 and the value of second configuration is 4 or when the value of comb parameter is 4 and the value of second configuration is 2; and 3, when the value of comb parameter is 4 and the value of second configuration is 4 or when the value of comb parameter is 2 and the value of second configuration is 8 or when the value of comb parameter is 8 and the value of second configuration is 2.

In some embodiments, the maximum number of the cyclic shift is determined based on the comb parameter and a size of a second subband, and the size is determined based on the first and the second configuration.

In some embodiments, a terminal device comprises circuitry configured to receive, at a terminal device and from a network device, at least one configuration of a sounding reference signal, the configuration comprising a first configuration of a first subband and a second configuration of a partial sounding; determine an index of a start resource block of a second subband, wherein the index is based on the first configuration, the second configuration and an offset; and transmit, to the network device, the sounding reference signal based on the index.

In some embodiments, the second subband is determined based on the first configuration and the second configuration.

In some embodiments, the offset is determined based on at least one of: a slot index, a symbol index, a subframe index, a hopping index, and a configuration in downlink control information or medium access control (MAC) control element (CE).

In some embodiments, the offset is $(\text{floor}(n/P_F)) \bmod P_F$ or $n \bmod P_F$, wherein $P_F$ represents a partial frequency indicated in the second configuration, n represents an index of a slot or an index of a symbol or an index of a subframe or a hopping index.

In some embodiments, a network device comprises circuitry configured to transmit, to a terminal device, a configuration of a sounding reference signal, the configuration comprising a first configuration of a first subband and a second configuration of a partial sounding; and receive, from the terminal device, the sounding reference signal based on a size of a second subband and an index of a start resource block, the size of the second subband being multiple of four and the index of the start resource block being multiple of four.

In some embodiments, the first configuration comprises: a number of physical resource blocks and a bandwidth parameter of sounding reference signal ($B_{SRS}$); and the second configuration comprises a partial frequency ($P_F$).

In some embodiments, a network device comprises circuitry configured to transmit, at a network device and to a terminal device, at least one configuration of a sounding reference signal, the at least one configuration comprising a first configuration of a first subband and a second configuration of a partial sounding; and receive, from the terminal device, the sounding reference signal based on the maximum number of the cyclic shift, the first and second configurations.

In some embodiments, the maximum number of the cyclic shift is determined based on a product of a value of the comb parameter and a value of the second configuration.

In some embodiments, the maximum number of the cyclic shift is at least one of: 8, when the value of comb parameter is 2 and the value of second configuration is 1; 12, when the value of comb parameter is 2 and the value of second configuration is 2; 6, when the value of comb parameter is 2 and the value of second configuration is 4 or when the value of comb parameter is 4 and the value of second configuration is 2; and 3, when the value of comb parameter is 4 and the value of second configuration is 4 or when the value of comb parameter is 2 and the value of second configuration is 8 or when the value of comb parameter is 8 and the value of second configuration is 2.

In some embodiments, the maximum number of the cyclic shift is determined based on the comb parameter and a size of a second subband, and the size is determined based on the first and the second configuration.

In some embodiments, a network device comprises circuitry configured to transmit, at a network device and to a terminal device, at least one configuration of a sounding reference signal, the configuration comprising a first configuration of a first subband and a second configuration of a partial sounding; and receive, from the terminal device, the sounding reference signal based on an index of a start resource block of a second subband, wherein the index is based on the first configuration, the second configuration and an offset.

In some embodiments, the second subband is determined based on the first configuration and the second configuration.

In some embodiments, the offset is determined based on at least one of: a slot index, a symbol index, a subframe index, a hopping index, and a configuration in DCI or MAC CE.

In some embodiments, the offset is $(\text{floor}(n/P_F)) \bmod P_F$ or $n \bmod P_F$, wherein $P_F$ represents a partial frequency indicated in the second configuration, n represents an index of a slot or an index of a symbol or an index of a subframe or a hopping index.

Figure 16:
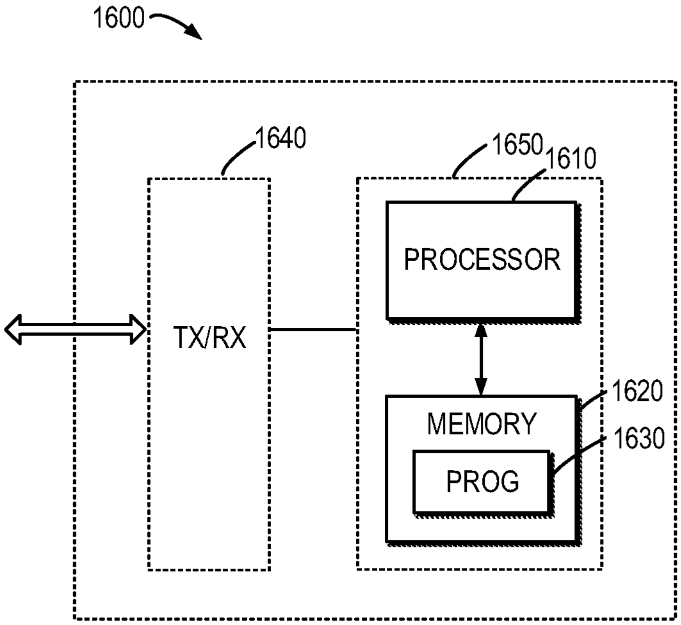
FIG. 16 is a simplified block diagram of a device that is suitable for implementing embodiments of the present disclosure.

FIG. 16 is a simplified block diagram of a device 1600 that is suitable for implementing embodiments of the present disclosure. The device 1600 can be considered as a further example implementation of the network device 120, or the terminal device 110 as shown in FIG. 1. Accordingly, the device 1600 can be implemented at or as at least a part of the terminal device 110, or the network device 120.

As shown, the device 1600 includes a processor 1610, a memory 1620 coupled to the processor 1610, a suitable transmitter (TX) and receiver (RX) 1640 coupled to the processor 1610, and a communication interface coupled to the TX/RX 1640. The memory 1610 stores at least a part of a program 1630. The TX/RX 1640 is for bidirectional communications. The TX/RX 1640 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1630 is assumed to include program instructions that, when executed by the associated processor 1610, enable the device 1600 to operate in accordance with the embodiments of the present disclosure, as discussed herein with reference to FIGS. 2 to 15. The embodiments herein may be implemented by computer software executable by the processor 1610 of the device 1600, or by hardware, or by a combination of software and hardware. The processor 1610 may be configured to implement various embodiments of the present disclosure. Furthermore, a combination of the processor 1610 and memory 1620 may form processing means adapted to implement various embodiments of the present disclosure.

The memory 1620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1620 is shown in the device 1600, there may be several physically distinct memory modules in the device 1600. The processor 1610 may be of any type suitable to the local technical network, and may include one or more of general purpose computers, special purpose computers, microprocessors, digital signal processors (DSPs) and processors based on multicore processor architecture, as non-limiting examples. The device 1600 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 to 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flow charts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:

determining an offset using a formula, wherein:

a first value m corresponds to a bandwidth of a sounding reference signal (SRS), a second value $P_F$ corresponds to a parameter for partial frequency sounding, wherein the second value $P_F$ is configured for partial frequency sounding, a third value n corresponds to a parameter for hopping, a fourth value $k_F$ corresponds to start resource block (RB) index, and the formula is based on $$\frac{(k_F + n) \bmod P_F}{P_F} \times m;$$

and transmitting the SRS to a network device based on a frequency domain starting position that is defined based on the offset.

2. The method of claim 1, wherein the third value n is determined using a symbol index of a resource of the SRS in time domain.

3. The method of claim 1, wherein the third value n is defined for slots that satisfy:

$$\left(N_{slot}^{frame,\mu} n_f + n_{s,f}^{\mu} - T_{offset}\right) \bmod T_{SRS} = 0.$$

4. The method of claim 1, wherein the third value n is determined using an SRS counter.

5. The method of claim 1, wherein the third value n is determined using a value of $(n_{SRS}/P_F) \bmod P_F$, and wherein $n_{SRS}$ represents an SRS counter.

6. The method of claim 1, wherein the fourth value $k_F$ satisfies: $k_F \in \{0,1, \ldots P_F-1\}$.

7. A method performed by a network device, the method comprising:

transmitting, to a terminal device, configuration information of a sounding reference signal (SRS), the configuration information comprising:

a first value m corresponding to a bandwidth of the SRS, wherein an offset is determined using a formula, wherein:

a second value $P_F$ corresponds to a parameter for partial frequency sounding, wherein the second value $P_F$ is configured for partial frequency sounding, a third value n corresponds to a parameter for hopping, a fourth value $k_F$ corresponds to start resource block (RB) index, the formula is based on $$\frac{(k_F + n) \bmod P_F}{P_F} \times m,$$

and receiving the SRS from the terminal device based on a determined frequency domain starting position that is defined based on the offset.

8. The method of claim 7, wherein the third value n is determined using a symbol index of a resource of the SRS in time domain.

9. The method of claim 7, wherein the third value n is defined for slots that satisfy:

$$(N_{slot}^{frame,\mu} n_f + n_{s,f}^{\mu} - T_{offset}) \bmod T_{SRS} = 0.$$

10. The method of claim 7, wherein the third value n is determined using an SRS counter.

11. The method of claim 7, wherein the offset is determined using a value of $(n_{SRS}/P_F) \bmod P_F$, and wherein $n_{SRS}$ represents an SRS counter.

12. The method of claim 7, wherein the fourth value $k_F$ satisfies: $k_F \in \{0,1, \ldots P_F-1\}$.

13. The method of claim 7, wherein the configuration information further comprises a parameter indicating the second value $P_F$, and wherein the second value $P_F$ is configured for partial frequency sounding.

14. A terminal device, comprising:

at least one memory having program instructions stored therein; and at least one processor configured to execute the program instructions that when executed cause the terminal device to perform operations comprising:

determining an offset using a formula, wherein:

a first value m corresponds to a bandwidth of a sounding reference signal (SRS), a second value $P_F$ corresponds to a parameter for partial frequency sounding, wherein the second value PE is configured for partial frequency sounding, a third value n corresponds to a parameter for hopping, a fourth value is $k_F$ corresponds to start resource block (RB) index, and the formula is based on $$\frac{(k_F + n) \bmod P_F}{P_F} \times m;$$

and transmitting the SRS to a network device based on a frequency domain starting position that is defined based on the offset.

15. The terminal device of claim 14, wherein the third value n is determined using on a symbol index of a resource of the SRS in time domain.

16. The terminal device of claim 14, wherein the third value n is defined for slots that satisfy:

$$(N_{slot}^{frame,\mu} n_f + n_{s,f}^{\mu} - T_{offset}) \bmod T_{SRS} = 0.$$

17. The terminal device of claim 14, wherein the third value n is determined using an SRS counter.

18. The terminal device of claim 14, wherein the third value n is determined using a value of $(n_{SRS}/P_F) \bmod P_F$, and wherein $n_{SRS}$ represents an SRS counter.

19. The terminal device of claim 14, wherein the fourth value $k_F$ satisfies: $k_F \in \{0,1, \ldots P_F-1\}$.

* * * * *